(12) United States Patent
Tateishi

(10) Patent No.: US 6,442,112 B1
(45) Date of Patent: Aug. 27, 2002

(54) METHOD OF AND APPARATUS FOR DETECTING AND COMPENSATING DEVIATION IN SERVO CONTROL SYSTEMS

(75) Inventor: Kiyoshi Tateishi, Tsurugashima (JP)

(73) Assignee: Pioneer Electronic Corporation, TOkyo-to (JP)

( * ) Notice: Subject to any disclaimer, the term of this patent is extended or adjusted under 35 U.S.C. 154(b) by 0 days.

(21) Appl. No.: 09/195,123

(22) Filed: Nov. 18, 1998

(30) Foreign Application Priority Data

Nov. 20, 1997 (JP) .............................................. 9-319218

(51) Int. Cl.⁷ ................................................. G11B 7/00
(52) U.S. Cl. ................................ 369/44.32; 369/44.34; 369/53.18
(58) Field of Search ......................... 369/44.27, 44.28, 369/44.29, 44.32, 44.34, 47.1, 53.1, 53.11, 53.12, 53.13, 53.14, 53.15, 53.16, 53.17, 53.18, 59.19

(56) References Cited

U.S. PATENT DOCUMENTS 5,233,586 A * 8/1993 Morisada .................. 369/44.32
5,610,886 A * 3/1997 Hayashi et al. .......... 369/44.29

FOREIGN PATENT DOCUMENTS

JP        8-129769         5/1996

* cited by examiner

*Primary Examiner*—Muhammad Edun
(74) *Attorney, Agent, or Firm*—Pitney, Hardin, Kipp & Szuch LLP

(57) ABSTRACT

A method of detecting a deviation in a servo control system to control a controlled system, has the processes of: applying a disturbance signal, which has a wave form having a constant frequency, to the controlled system; detecting a variation in a wave form of an output signal output from the controlled system by comparing the wave form of the output signal with the wave form of the disturbance signal; and detecting the deviation on the basis of the detected variation.

18 Claims, 20 Drawing Sheets

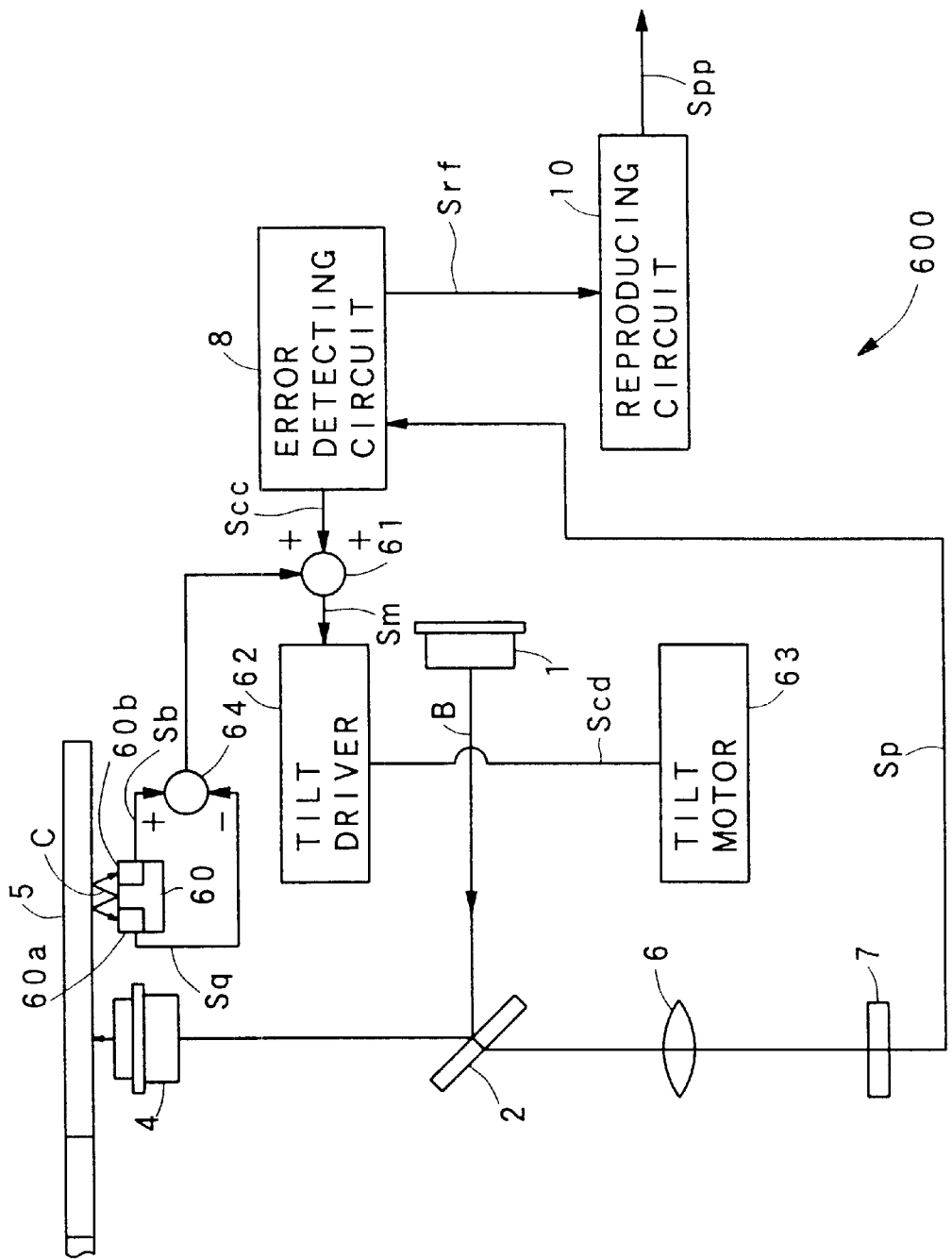

METHOD OF AND APPARATUS FOR DETECTING AND COMPENSATING DEVIATION IN SERVO CONTROL SYSTEMS

BACKGROUND OF THE INVENTION

1. Field of the Invention

The present invention relates generally to a deviation detecting and compensating method and apparatus for an information reproducing apparatus, which reproduces information recorded on a recording medium, or an information recording apparatus, which records information on a recording medium, and more specifically to a deviation detecting and compensating method and apparatus for detecting and compensating a deviation in a servo control system, such as a tilt servo control system, a tracking servo control system, a focus servo control system or the like.

2. Description of the Related Art

In an information reproducing apparatus for reproducing information recorded on an optical disk or an information recording apparatus for recording information on an optical disk, some kinds of servo controls are carried out. For example, a tracking serve control is carried out in order to control the spot position with respect to a track on the optical disk. A focus servo control is carried out in order to control a focal distance of the light beam. A tilt servo control is carried out in order to control a tilt between the surface of the optical disk and the optical axis of the light beam.

Generally, in such servo control systems, a deviation or error is obtained by comparing an actual amount (measured amount) corresponding to an actual spot position, focal distance or tilt with a desired amount such as a reference voltage. Then, the actual spot position, focal distance or tilt is adjusted so as to reduce the deviation. If the deviation is reduced to zero, the actual spot position, focal distance or tilt becomes correct.

However, it is difficult to eliminate deviations completely for the following reason. Optical disks have a various different deviations, such as out-of-roundness, eccentric location of the center hole, warp etc.. Therefore, the different deviation occurs for each optical disk. Furthermore, if the optical disk has warp partially, degree of the deviation is different between the inner circumference and the outer circumference of the optical disk.

A number of solutions of this problem has been proposed. For example, a possibility of eliminating such deviations is shown in Japanese patent application laid open (KOKAI), No. 8-129769.

However, these solutions needs complex calculations and learning functions. It is difficult to carry out the calculations and the learning functions rapidly. As quickness is important to the servo control systems in the information reproducing apparatus or the information recording apparatus, it is necessary to eliminate such deviations not only completely but also rapidly with respect to each optical disk.

SUMMARY OF THE INVENTION

It is therefore a first object of the present invention to provide a method and apparatus for detecting a deviation in a servo control system, which can detect the deviation accurately and rapidly.

A second object of the present invention is to provide a method and apparatus for compensating a deviation in a servo control system, which can compensate the deviation completely and rapidly.

The aforementioned first object can be achieved by a deviation detecting method of the present invention. The deviation detecting method has the processes of: applying a disturbance signal, which has a wave form having a constant frequency, to a controlled system; detecting a variation in a wave form of an output signal output from the controlled system by comparing the wave form of the output signal with the wave form of the disturbance signal; and detecting the deviation on the basis of the detected variation.

In an electrical or optical servo control system and its controlled system, the wave form of the output signal output from the controlled system varies depending on the presence of the deviation. The variation of the wave form of the output signal can be detected by comparing this wave form with a standard wave form. Then, the deviation can be detected on the basis of this variation.

More specifically, the disturbance signal is applied to the controlled system. The disturbance signal has a wave form having a constant frequency. This signal serves as the standard signal.

As the disturbance signal is applied to the controlled system, the output signal from the controlled system has a wave form. If there is a deviation, the wave form of the output signal varies.

This variation is detected by comparing the wave form of the output signal with the wave form of the disturbance signal. Then, the deviation is detected on the basis of the detected variation.

Thus, the deviation in the servo control system can be accurately detected without any complex calculations or any learning functions. Since neither complex calculation nor leaning function is used, the deviation can be rapidly detected.

In the aforementioned deviation detecting method, the variation detecting process may has the processes of: detecting a first timing that a level of the disturbance signal reaches a first level; detecting a second timing that a level of the output signal reaches a second level; and detecting the variation in the wave form of the output signal by comparing the first timing with the second timing. Therefore, the deviation in the servo control system can be accurately detected by a simple construction.

Furthermore, in the aforementioned deviation detecting method, it is desirable that the first level is an average of the level of the disturbance signal, and the second level is an average of the level of the output signal. Therefore, the detection process can be carried out easily. Alternatively, the second level may be a peak of the level of the output signal.

Moreover, in the aforementioned deviation detecting method, the variation detecting process may has the processes of: generating an envelope of the output signal; and detecting a variation in a wave form of the envelope by comparing the wave form of the envelope with the wave form of the disturbance signal. Therefore, the detection process can be carried out easily.

The aforementioned second object can be achieved by a deviation compensating method of the present invention. The deviation compensating method has the processes of: applying a control signal, which is a direct current signal, to a controlled system; adding a disturbance signal, which has a wave form having a constant frequency, to the control signal; detecting a variation in a wave form of an output signal output from the controlled system by comparing the wave form of the output signal with the wave form of the disturbance signal; detecting the deviation on the basis of the detected variation; and varying a level of the control signal on the basis of the detected deviation so as to reduce the detected deviation.

In this deviation compensating method, deviation in the servo control system is detected by the same method as the aforementioned deviation detecting method. Then, the level of the control signal is adjusted on the basis of the detected deviation.

Thus, the deviation in the servo control system can be accurately detected without any complex calculations or any learning functions. Since neither complex calculation nor leaning function is used, the deviation can be rapidly detected. As a result, the deviation can be compensated completely and rapidly.

The aforementioned first object can be also achieved by an deviation detecting apparatus of the present invention. The deviation detecting apparatus has: an applying device for applying a disturbance signal, which has a wave form having a constant frequency, to the controlled system; a variation detecting device for detecting a variation in a wave form of an output signal output from a controlled system by comparing the wave form of the output signal with the wave form of the disturbance signal; and a deviation detecting device for detecting the deviation on the basis of the detected variation.

In an electrical or optical servo control system and its controlled system, the wave form of the output signal output from the controlled system varies depending on the presence of the deviation. The variation of the wave form of the output signal can be detected by comparing this wave form with a standard wave form. Then, the deviation can be detected on the basis of this variation.

More specifically, the disturbance signal is applied to the controlled system. The disturbance signal has a wave form having a constant frequency. This signal is the standard signal.

As the disturbance signal is applied to the controlled system, the output signal from the controlled system has a wave form. If there is a deviation, the wave form of the output signal varies.

This variation is detected by comparing the wave form of the output signal with the wave form of the disturbance signal. Then, the deviation is detected on the basis of the detected variation.

Thus, the deviation in the servo control system can be accurately detected without any complex calculations or any learning functions. Since neither complex calculation nor leaning function is used, the deviation can be rapidly detected.

In the aforementioned deviation detecting apparatus, the variation detecting device may includes: a first timing detecting device for detecting a first timing that a level of the disturbance signal reaches a first level; a second timing detecting device for detecting a second timing that a level of the output signal reaches a second level; and a wave form variation detecting device for detecting the variation in the wave form of the output signal by comparing the first timing with the second timing. Therefore, the deviation in the servo control system can be accurately detected by a simple construction.

Furthermore, in the aforementioned deviation detecting apparatus, it is desirable that the first level is an average of the level of the disturbance signal, and the second level is an average of the level of the output signal. Alternatively, it is desirable that the second level is a peak of the level of the output signal. Therefore, the detection process can be carried out easily.

Moreover, in the aforementioned deviation detecting apparatus, the variation detecting device has: an envelope generating device for generating an envelope of the output signal; and an envelope variation detecting device for detecting a variation in a wave form of the envelope by comparing the wave form of the envelope with the wave form of the disturbance signal. Therefore, the detection process can be carried out easily.

The aforementioned second object can be achieved by an deviation compensating apparatus of the present invention. The deviation compensating apparatus has: a control signal applying device for applying a control signal, which is a direct current signal, to the controlled system; a disturbance signal adding device for adding a disturbance signal, which has a wave form having a constant frequency, to the control signal; a variation detecting device for detecting a variation in a wave form of an output signal output from the controlled system by comparing the wave form of the output signal with the wave form of the disturbance signal; a deviation detecting device for detecting the deviation on the basis of the detected variation; and a varying device for varying a level of the control signal so as to reduce the detected deviation.

In this deviation compensating apparatus, deviation in the servo control system is detected by the same manner as that in the aforementioned deviation detecting apparatus. Then, the level of the control signal is adjusted on the basis of the detected deviation.

Thus, the deviation in the servo control system can be accurately detected without any complex calculations or any learning functions. Since neither complex calculation nor leaning function is not used, the deviation can be rapidly detected. As a result, the deviation can be compensated completely and rapidly.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 20 is a block diagram showing a tilt servo control system of a fifth embodiment of the present invention.

DETAILED DESCRIPTION OF THE PREFERRED EMBODIMENTS

Referring to the accompanying drawings, embodiments of the present invention will be now described.

I. First Embodiment

A first embodiment of the present invention will be described with reference to FIGS. 1 through 7. In the description set forth hereinafter, the present invention is embodied in a tilt servo control system of an information reproducing apparatus, which has a construction to compensate wavefront aberration, which is caused by a "tilt" between the information recording surface of an optical disk and the optical axis of a light beam, by using a liquid crystal (LC) panel, which is located on the optical path of the light beam.

Figure 1:
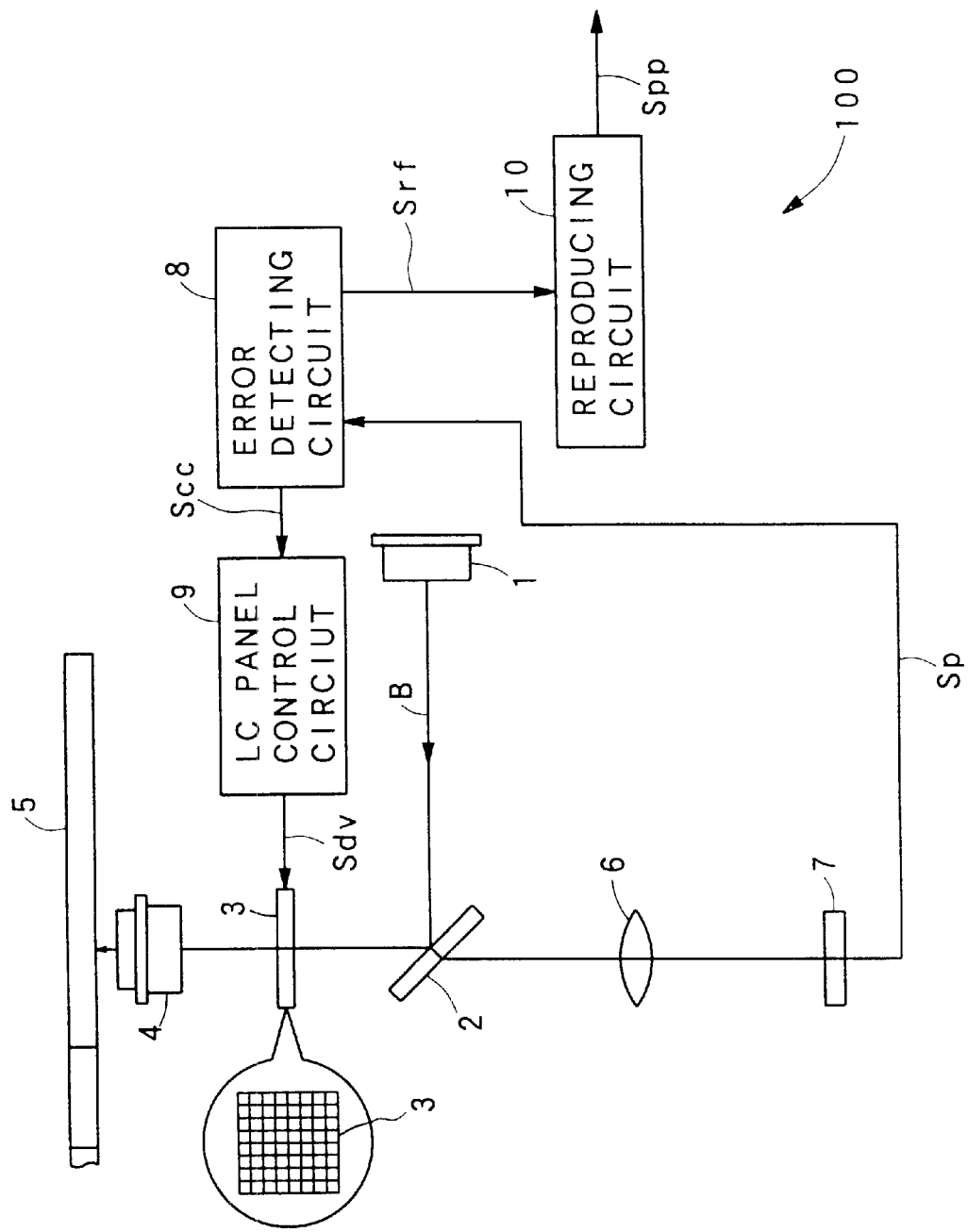
FIG. 1 is a block diagram showing a tilt servo control system of a first embodiment of the present invention.

FIG. 1 shows a tilt servo control system 100 of the first embodiment of the present invention. As shown in FIG. 1, the tilt servo control system 100 has a laser diode 1, a polarizing beam splitter 2, a liquid crystal (LC) panel 3, an objective 4, an optical disk 5, a collective lens 6, a detector 7, an error detecting circuit 8, a liquid crystal (LC) panel control circuit 9 and a reproducing circuit 10.

The laser diode 1 generates a light beam B to be used for reproducing information, and emits it to the polarizing beam splitter 2. The polarizing beam splitter 2 reflects this light beam B and guides it to the LC panel 3. The LC panel 3 gives an optical path difference to the light beam B passing therethrough according to driving signals Sdv generated by the LC panel control circuit 9 in order to compensate the wavefront aberration caused by the tilt.

The LC panel 3 has a surface perpendicular to the optical path. This surface, as shown in FIG. 1, is divided into small squares arranged in a matrix. In each square, liquid crystal is contained. The molecules of the liquid crystal changes direction with a control voltage (i.e. voltage of the driving signal Sdv). Therefore, the refraction factor of the light beam B passing through each square can be changed according to the control voltage. The control voltages are independently applied to these respective squares, and can be changed independently with respect to each square. Therefore, phase differences can be given to the light beam B passing through the LC panel 3. Thus, the optical path difference can be generated in the light beam B, and the wavefront aberration can be compensated.

The objective 4 focuses the light beam passing through the LC panel 3 on the optical dick 5.

The light beam B reflected by the optical disk 5 goes through the LC panel 3, the polarizing beam splitter 2 and the collective lens 6 and reaches the detector 7. The collective lens 6 focuses this light beam B on the detector 7. At this time, the intensity of this reflected light beam B has been modulated according to information which is recorded on the optical disk 5 as pits, and the polarization surface of this reflected light beam B has been rotated according to the pits.

The detector 7 generates a detection signal Sp corresponding to the information recorded on the optical disk 5 according to the light beam B, and outputs this detection signal SP to the error detecting circuit 8.

The error detecting circuit 8 generates a reproducing signal according to the detection signal Sp, and feeds this signal as an RF (Radio Frequency) signal Srf into the reproducing circuit 10.

The reproducing circuit 10 decodes the RF signal Srf, and outputs a reproducing signal Spp corresponding to the information recorded on the optical disk 5.

While the aforementioned operations are being carried out, the error detecting circuit 8 detects a tilt (tilt error) between the surface of the optical disk 5 and the optical axis of the light beam B on the basis of the RF signal Srf. The tilt causes the wavefront aberration in the light beam B. The error detecting circuit 8 outputs a deviation signal Scc corresponding to detected tilt to the LC panel control circuit 9. The LC panel control circuit 9 generates the driving signals Sdv according to the deviation signal Scc in order to eliminate the tilt.

Figure 2:
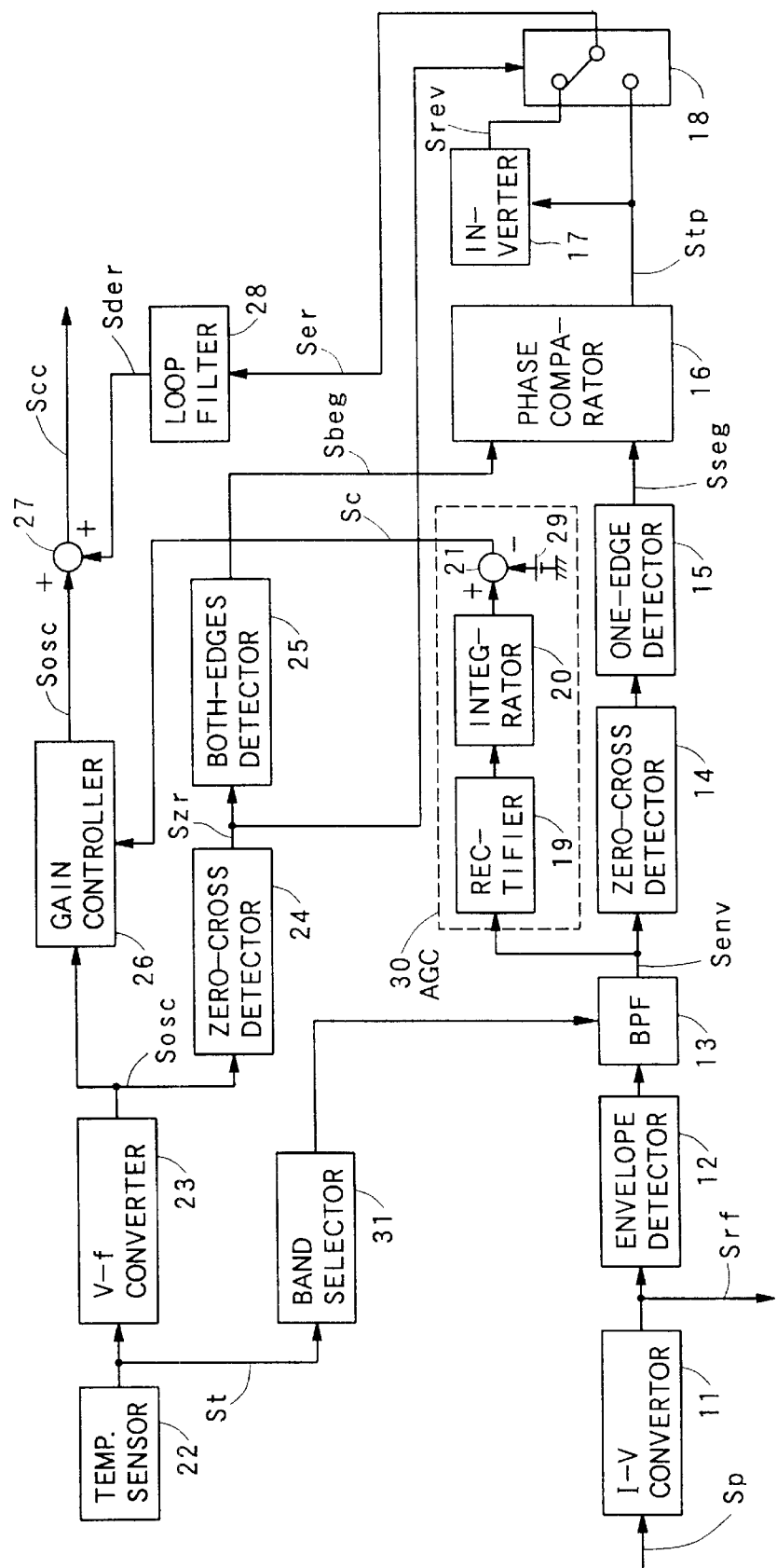
FIG. 2 is a block diagram showing an error detecting circuit of the first embodiment.

Next, FIG. 2 shows the construction of the error detecting circuit 8 in detail. As shown in FIG. 2, the error detecting circuit 8 has a current-voltage (I-V) converter 11, an envelope detector 12, a band pass filter (BPF) 13, a couple of zero-cross detectors 14 and 24, a one-edge detector 15, a phase comparator 16, an inverter 17, a switch 18, an automatic gain controller (AGC) 30, a temperature sensor 22, a voltage-frequency (V-f) converter 23, a both-edges detector 25, a gain controller 26, an adder 27, a loop filter 28 and a band selector 31.

The AGC 30 has a rectifier 19, an integrator 20, a subtracter 21 and a reference voltage generator 29.

When there is no tilt between the optical disk 5 and the light beam B, the error detecting circuit 8 operates as follows.

Firstly, the temperature sensor 22 detects ambient temperature of the information reproducing apparatus, and outputs a detection signal St having voltage corresponding to the detected ambient temperature.

Figure 3:
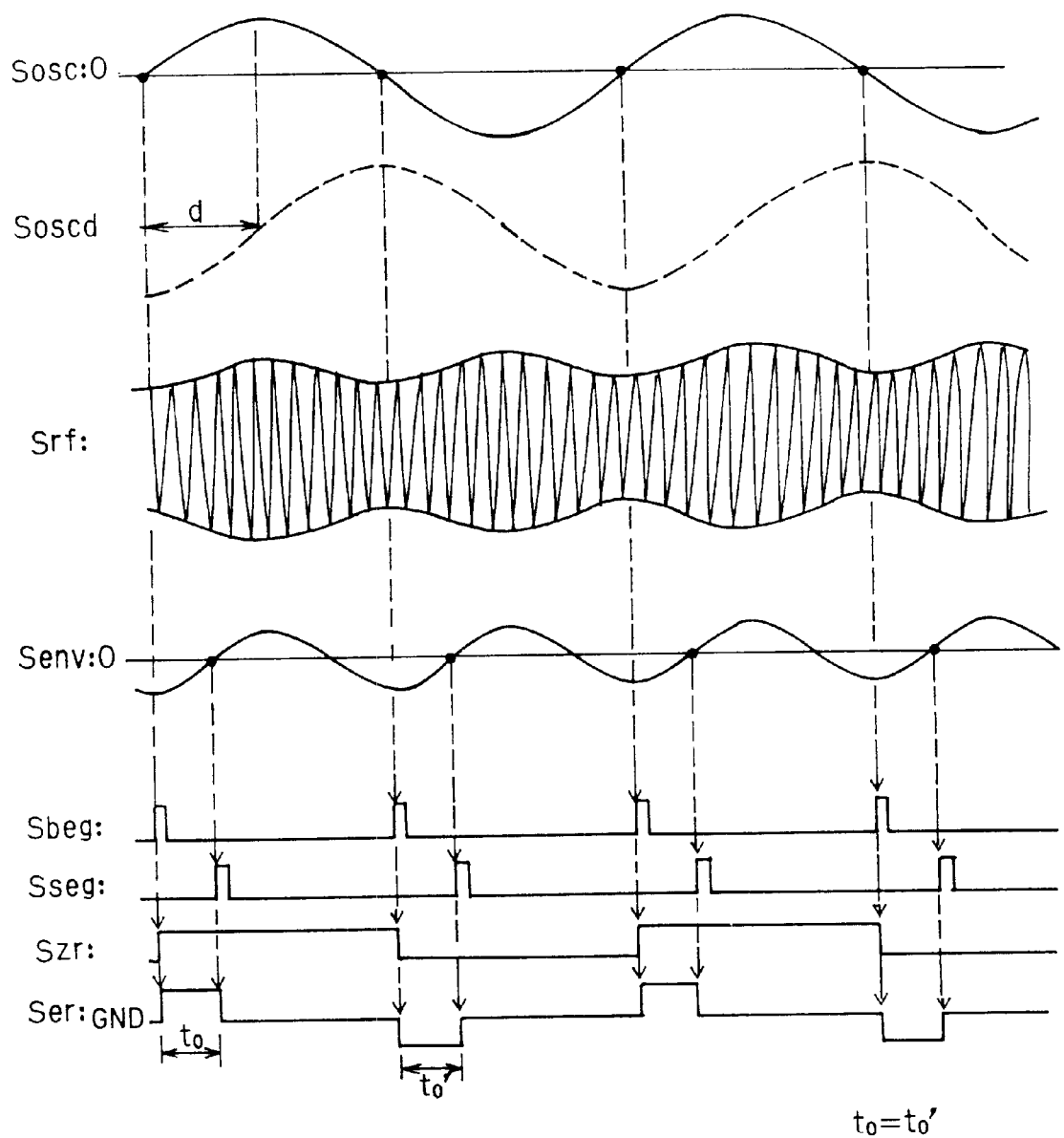
FIG. 3 is a diagram showing a relationship between signals in time in the error detecting circuit of the first embodiment.

Next, the V-f converter 23 generates a basic signal Sosc. The basic signal Sosc is used for applying disturbance which has a wave form having a constant frequency to the tilt servo control system 100. The basis signal Sosc is an alternating signal having a certain frequency, as shown in FIG. 3.

Actually, the V-f converter 23 generates the basis signal Sosc in the following manner. The V-f converter 23 has a frequency data table, where frequency data corresponding to various ambient temperatures are described. The V-f converter 23 selects one frequency data from the frequency data table according to the voltage of the detection signal St, and sets the frequency corresponding to the selected frequency data as the frequency f0 of the basic signal Sosc.

The reason why the frequency f0 of the basic signal Sosc is decided according to the ambient temperature will be explained. The disturbance that has been applied to the tilt servo control system 100 must be finally eliminated from the tilt servo control system 100. Therefore, in order to make the elimination of the disturbance easy and accurate, it is desirable that the amount of the disturbance to be applied to the tilt servo control system 100 is made constant. Here, the amount of the disturbance varies according to the frequency of the disturbance. Furthermore, the property of the direction of the liquid crystal molecules varies with the ambient temperature, so that the total amount of the light beam passing through the LC panel 3 varies with the ambient temperature. Therefore, it is assumed that the frequency of the disturbance is constant, the amount of the disturbance varies with the ambient temperature. However, since the amount of the disturbance varies according to the frequency of the disturbance, it is possible to compensate the changes of the amount of the disturbance due to the ambient temperature by adjusting the frequency of the disturbance. That is, it is possible to keep the amount of the disturbance constant by adjusting the frequency of the disturbance, if the ambient temperature changes. The frequency of the disturbance is decided on the basis of the frequency of the basic signal Sosc. Therefore, the frequency f0 of the basic signal Sosc is decided depending on the ambient temperature so as to keep the amount of the disturbance constant.

Furthermore, the frequency f0 of the basic signal Sosc is decided in consideration of speed of response of the tilt servo control system 100. In order to make the speed of response higher, it is needed that the frequency f0 of the basic signal Sosc is set at a relatively high frequency. Therefore, the V-f converter 23 sets the frequency f0 at 200 Hz at the time of ordinary temperature, for example.

Next, the basic signal Sosc is fed into the gain controller 26, and next fed into the adder 27. As described later, the gain of the basic signal Sosc is adjusted by the gain controller 26, and an adjusting signal Sder is added to the basic signal Sosc by the adder 27. Then, the basic signal Sosc is fed as the deviation signal Scc into the LC panel control circuit 9.

The basic signal Sosc is also applied to the zero-cross detector 24. The zero-cross detector 24 detects the zero cross point of the basic signal Sosc, and generates a detection signal Szr on the basis of the zero cross point of the basic signal Sosc. More concretely, the zero-cross detector 24 holds its output voltage at the high level while amplitude of the basic signal Sosc is higher than that of the zero cross point. While amplitude of the basic signal Sosc is equal to or lower than that of the zero cross point, the zero-cross detector 24 holds the output voltage at low level. Thus, the zero-cross detector 24 generates the detection signal Szr, as shown in FIG. 3. The detection signal Szr is fed into the both-edges detector 25 and the switch 18.

Next, the both-edges detector 25 generates a short pulse when the level of the detection signal Szr switches from the high level to the low level and from the low level to the high level (i.e., at the timing corresponding to the zero cross points), as shown in FIG. 3. This short pulse signal is fed as an edge signal Sbeg into the phase comparator 16.

The detection signal Sp, which is input from the detector 7 to the error detection circuit 8 (FIG. 1), is converted into the RF signal Srf by the I-V converter 11, and fed into the envelope detector 12 and the reproducing circuit 10.

As shown in FIG. 3, the RF signal Srf has the frequency that is twice as high as the frequency of the basic signal Sosc. This is because the tilt servo control system 100 is a time lag system of first order. Furthermore, the phase of the RF signal Srf lags behind the that of the basic signal Sosc by 90 degrees. In FIG. 3, the phase of a lagged signal Soscd lags behind that of the basic signal Sosc by 90 degrees, and the RF signal Srf is synchronized with this signal in phase. This is because the tilt servo control system 100 is the time lag system of first order, and the frequency f0 of the basic signal Sosc is high.

Figure 4A:
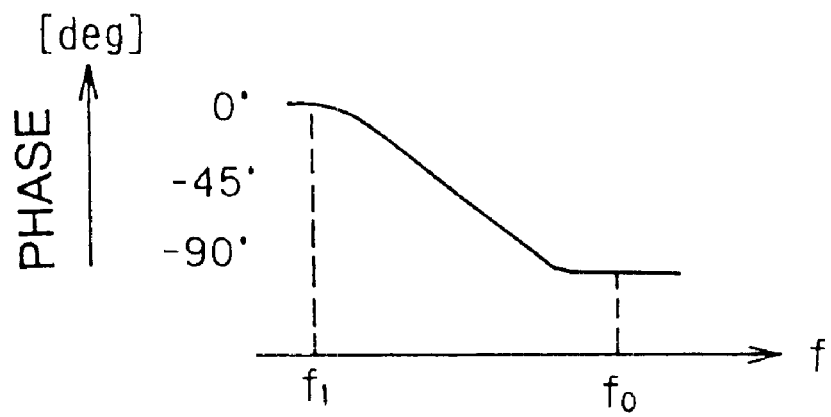
FIGS. 4A and 4B are diagrams each showing a relationship between a frequency of a basic signal and a phase of an RF signal.

Generally, in the time lag system of first order, there is a certain relationship of the frequency of an input signal and the phase of an output signal, as shown in FIG. 4A. As seen from FIG. 4A, if the frequency of the input signal is roughly higher than f0, the phase of the output signal lags by 90 degrees. Furthermore, when the frequency of the input signal is in the range of about f1 to f0, the phase of the output signal varies according to the change of the frequency. However, if the frequency of the input signal is roughly higher than f0, the phase of the output signal becomes stable. In the tilt servo control system 100 of the first embodiment, the frequency of the basic signal Sosc is set at f0 in consideration of high speed response and stability of the phase lag of the RF signal Srf. Therefore, the phase of the RF signal Srf lags behind that of the basic signal Sosc by 90 degrees.

Next, in FIG. 2, the envelope of the RF signal Srf is detected by the envelope detector 12, and passes through the BPF 13. The center frequency of the BPF 13 is twice as high as the frequency f0. Thus, the envelope of the RF signal Srf is extracted from the RF signal Srf, as shown in FIG. 3. Then, this signal is fed as an envelope signal Senv into the rectifier 19 and the zero-cross detector 14.

The band selector 31 selects the frequency that is twice as high as the frequency f0 according to the detection signal St, and feeds an selection signal Sbs including information with respect to the selected frequency to the BPF 13. As a result, the center frequency of the BPF 13 is set at the frequency that is twice as high as the frequency f0, even if the frequency f0 of the basic signal Sosc varies with the ambient temperature.

Next, the rectifier 19 rectifies the envelope signal Senv. Then, the integrator 20 integrates the rectified envelope signal. As a result, the average of the envelope signal Senv is generated at a predetermined cycle. Next, the average of the envelope signal Senv is fed as an average envelope signal from the integrator 20 to the subtracter 21. The subtracter 21 subtracts a reference voltage from the voltage of the average envelope signal. The reference voltage is a desired voltage of this tilt servo control system 100, and generated by the reference voltage generator 29. Then, the difference between the voltage of the average envelope signal and the reference voltage is fed as a control signal Sc into the gain controller 26. The gain controller 26 adjusts the voltage of the direct component of the basic signal Sosc according to the control signal Sc, so as to reduce the difference between the voltage of the average envelope signal and the reference voltage.

Thus, deviation caused by changes of the ambient temperature can be roughly eliminated by setting the frequency f0 of the basic signal Sosc according to the detected ambient temperature. This is a coarse control. Further, the deviation with respect to the ambient temperature can be accurately eliminated by the gain controller 26. This is a fine control.

The zero-cross detector 14 detects the zero cross point of the envelope signal Senv, which is applied from the BPF 13. Then, the one-edge detector 15 generates a short pulse when the amplitude of the envelope signal Senv changes from negative to positive at the zero cross point, as shown in FIG. 3. This short pulse signal is fed as an edge signal Sseg into the phase comparator 16.

The phase comparator 16 compares the timing that the short pulse of the edge signal Sbeg rises with the timing that the short pulse of the edge signal Sseg rises. More concretely, the phase comparator 16 switches its output voltage from the low level to the high level at the timing that the short pulse of the edge signal Sbeg rises, and then switches the output voltage from the high level to the low level at the timing that the short pulse of the edge signal Sseg rises. Then, the phase comparator 16 feeds the output voltages as a phase signal Stp. Next, the phase signal Stp is fed into the switch 18 directly, and also fed into the inverter 17. The inverter 17 inverts the polarity of the phase signal Stp. This inverted signal is fed as the inverted signal Srev into the switch 18.

The switch 18 is controlled by the detection signal Szr generated by the zero-cross detector 24. Namely, the switch 18 outputs the phase signal Stp as an error signal Ser while the level of the detection signal Szr is high. On the other hand, the switch 18 outputs the inverted signal Srev as the error signal Ser while the level of the detection signal Szr is low.

As a result, the error signal Ser has positive pulses and negative pulses, as shown in FIG. 3. These positive pulses and negative pulses are alternately located.

The error signal Ser is fed into the loop filter 28. The loop filter 28 calculates the average of the voltage of the error signal Ser. This average is fed as the adjusting signal Sder into the adder 27. The adder 27 adds the voltage (dc voltage) of the adjusting signal Sder to the basic signal Sosc. The resultant signal is fed as the deviation signal Scc into the LC panel control circuit 9.

As shwon in FIG. 3, if there is no tilt, the envelope signal Senv is synchronized with the lagged signal Soscd and the frequency of the envelope signal Senv is twice as high as that of the lagged signal Soscd. As a result, in the wave form of the error signal Ser, the widths of all of the positive pulses and negative pulsees are the same, namely, t0=t0'. That is, the width of the positive pulse is equal to that of the negative pulse with respect to all of the positive pulses and negative pulse. Therefore, the average of the voltage of the error signal Ser is zero, so that no voltage is added to the basic signal Sosc. Consequently, if there is no tilt, the LC panel control circuit 9 generates the driving signals Sdv such that no phase difference is given to the light beam B by the LC panel 3.

Next, when there is a tilt between the optical disk 5 and the light beam B, the error detecting circuit 8 operates as follows.

Figure 5:
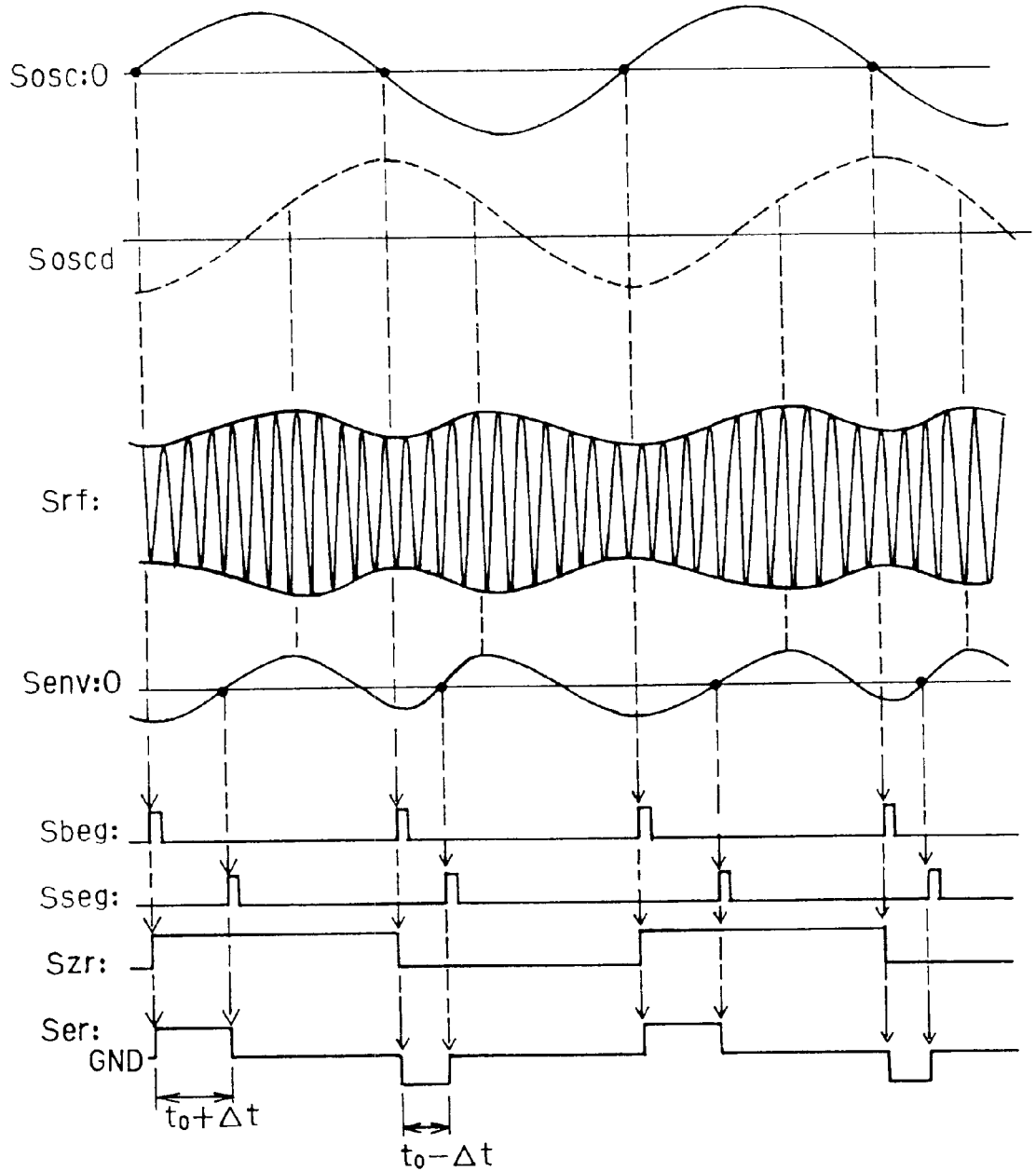
FIG. 5 is a diagram showing a relationship between signals in time in the error detecting circuit of the first embodiment.
Figure 6:
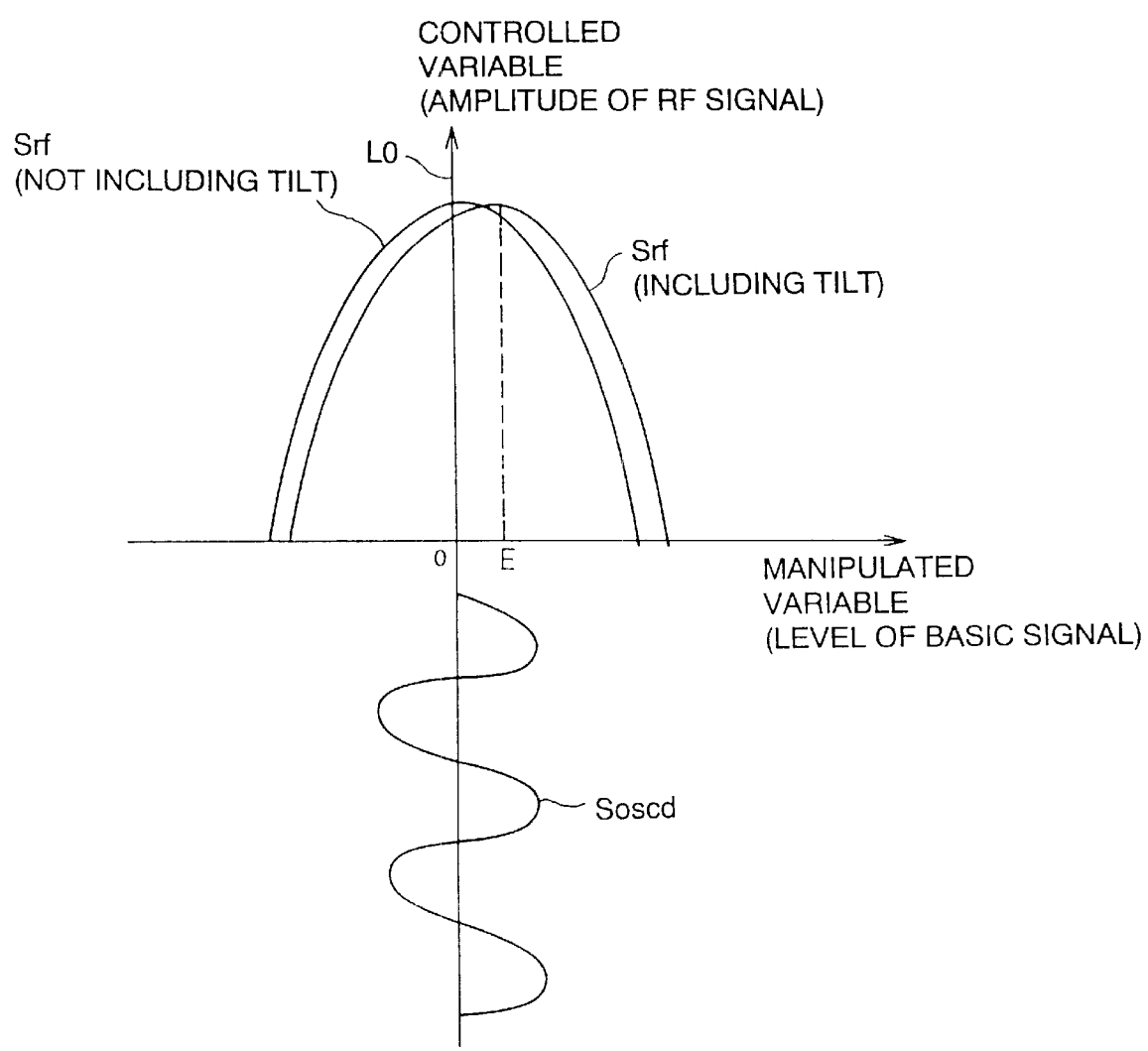
FIG. 6 is a diagram showing a relationship between the amplitude of the RF signal and that of the basic signal.

If there is a tilt in one direction (negative direction), the wave form of the RF signal Srf changes, as shown in FIG. 5. This reason will be explained with reference to FIG. 6. FIG. 6 shows a relationship between the lagged signal Soscd and the amplitudes of the RF signals, depending on the presence or the absence of the tilt.

As shown in FIG. 6, if there is no tilt, the amplitude of the RF signal becomes maximum when the level of the lagged signal Soscd is zero, and the wave form of the amplitude of the RF signal Srf is symmetrical with respect to the center line L0. Therefore, if there is no tilt, the peak point and the zero cross point appear at regular intervals in the wave form of the envelope signal Senv, as shown in FIG. 3.

In contrast, if there is a tilt, the amplitude of the RF signal Srf becomes maximum when the level of the lagged signal Soscd is not zero, as shown in FIG. 6. Therefore, if there is a tilt, the timing of the peak point or the zero cross point of the envelope signal Senv does not match the timing that the lagged signal Soscd becomes zero, so that the peak point or the zero cross point does not appear at regular intervals in the wave form of the envelope signal Senv, as shown in FIG. 5 or 7.

If the wave form of the RF signal Srf (envelope signal Senv) changes, the timing that the short pulse of the edge signal Sseg rises shifts by ±Δt, as shown in FIG. 5. As a result, in the error signal Ser, the width of the positive pulses becomes long by +Δt (t0+Δt), and the width of the negative pulse becomes short by −Δt (t0−Δt). As a result, in the error signal Ser, the width of the positive pulse is longer than that of the negative pulse. Therefore, the average of the voltage of the error signal Ser becomes a positive number, so that a positive dc voltage is obtained from the loop filter 28. Consequently, if there is a tilt in the positive direction, the positive dc voltage which corresponds to the amount of the tilt is added to the basic signal Sosc by the adder 27. Then, this basic signal Sosc is fed as the deviation signal Scc into the LC panel control circuit 9.

When the LC panel control circuit 9 receives this deviation signal Scc, the LC panel control circuit 9 recognizes the amount and direction of the tilt on the basis of the deviation signal Scc, and generates the driving signals Sdv so as to reduce the error caused by the tilt (i.e, so as to reduce the positive dc voltage component from the deviation signal Scc). As a result, the wavefront aberration caused by the tilt is compensated.

Figure 7:
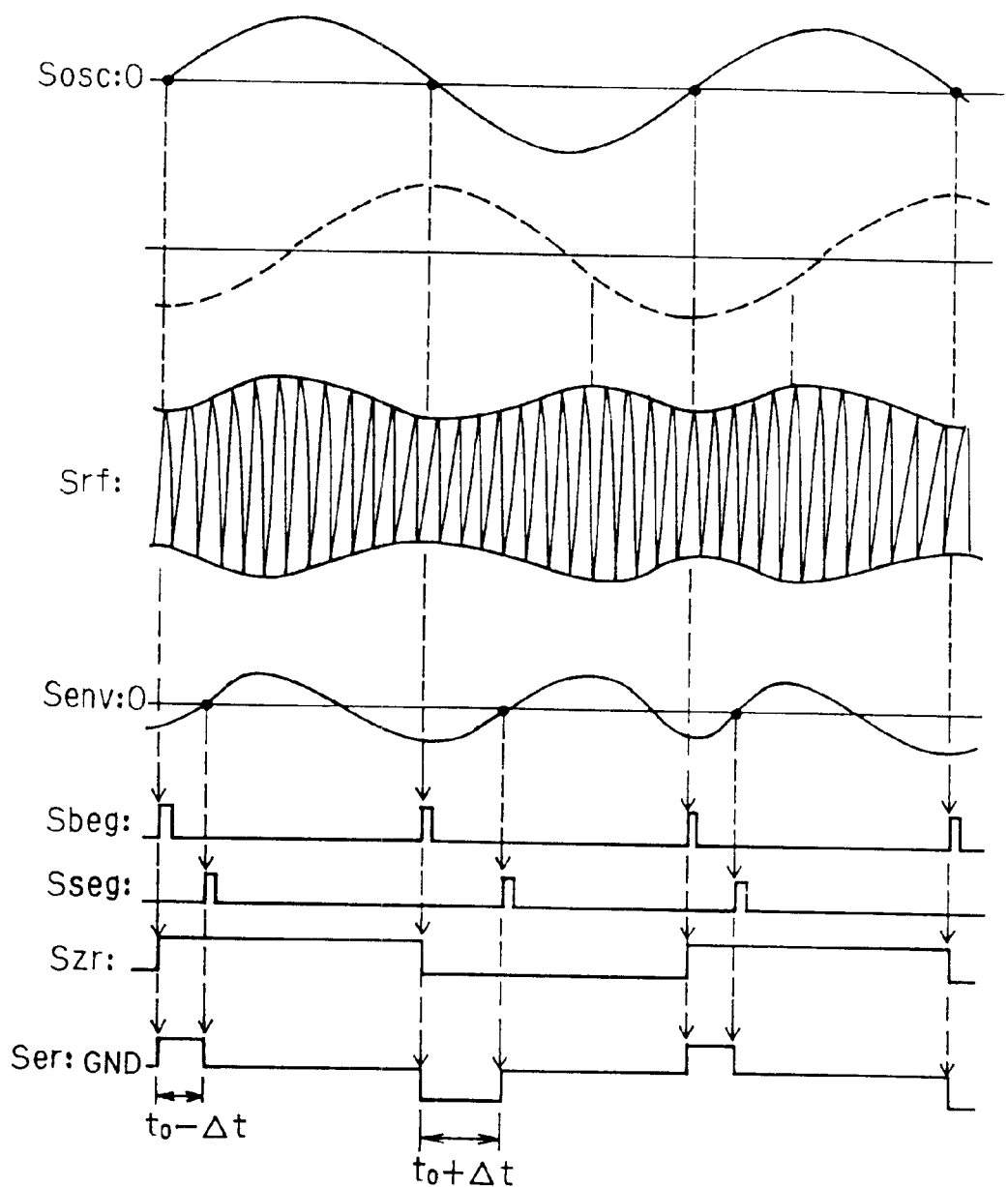
FIG. 7 is a diagram showing a relationship between signals in time in the error detecting circuit of the first embodiment.

If there is a tilt in the opposite direction (positive direction), the wave form of the RF signal Srf changes, as shown in FIG. 7. This reason was already explained (FIG. 6).

If the wave form of the RF signal Srf (envelope signal Senv) changes, the timing that the short pulse of the edge signal Sseg rises shifts by ±Δt, as shown in FIG. 7. Here, the direction of the shift of the short pulse is opposite to that of the shift of the short pulse shown in FIG. 5. As a result, in the error signal Ser, the width of the positive pulse becomes short by −Δt (t0−Δt), and the width of the negative pulse becomes long by +Δt (t0+Δt), so that the width of the positive pulse is shorter than that of the negative pulse. Therefore, the average of the voltage of the error signal Ser becomes a negative number, so that a negative dc voltage is obtained from the loop filter 28. Consequently, if there is a tilt in the negative direction, the negative dc voltage which corresponds to the amount of the tilt is added to the basic signal Sosc by the adder 27. Then, this basic signal Sosc is fed as the deviation signal Scc into the LC panel control circuit 9.

When the LC panel control circuit 9 receives this deviation signal Scc, the LC panel control circuit 9 recognizes the amount and direction of the tilt on the basis of the deviation signal Scc, and generates the driving signals Sdv so as to reduce the error caused by the tilt (i.e, so as to reduce the negative dc voltage component from the deviation signal Scc). As a result, the wavefront aberration caused by the tilt is compensated.

According to the tilt servo control system 100 of the first embodiment of the present invention, the amount and direction of the tilt can be detected on the basis of changes of the wave form of the RF signal Srf. Therefore, if the degree of the tilt is different between the inner circumference and the outer circumference of the optical disk, or if the degree of the tilt is different in each optical disk, the amount and direction of the tilt can be detected accurately. As a result, the wave aberration caused by the tilt can be completely eliminated.

Furthermore, as the amount and direction of the tilt can be detected on the basis of changes of the wave form of the RF signal Srf, neither complex calculation nor leaning function is required. Therefore, the amount and direction of the tilt can be detected rapidly and accurately by the simple construction.

Furthermore, as the changes of the wave form of the RF signal is detected by comparing the timing that the level of the basic signal Sosc reaches a zero level with the timing that the level of the envelope signal Senv reaches a zero level, the amount and direction of the tilt can be detected rapidly and accurately by the simple construction.

In addition, in the first embodiment, as the LC panel 3 is used for compensation of the wavefront aberration, the optical path difference can be easily given to the light beam B.

Moreover, although deviation caused by changes of the ambient temperature is eliminated by the temperature sensor 22, the V-f converter 23, the gain controller 26, AGC 30 and the band selector 31. However, if the exact elimination of the deviation with respect to the ambient temperature is not required, this deviation may be eliminated by the temperature sensor 22, the V-f controller 24 and the band selector 31. Alternatively, this deviation may be eliminated by the AGC 30 and the gain controller 26.

II. Second Embodiment

Next, a second embodiment of the present invention will be described with reference to FIGS. 8 through 13. In the description set forth hereinafter, the present invention is embodied in a focus servo control system and a tracking servo control system of an information reproducing apparatus.

Figure 8:
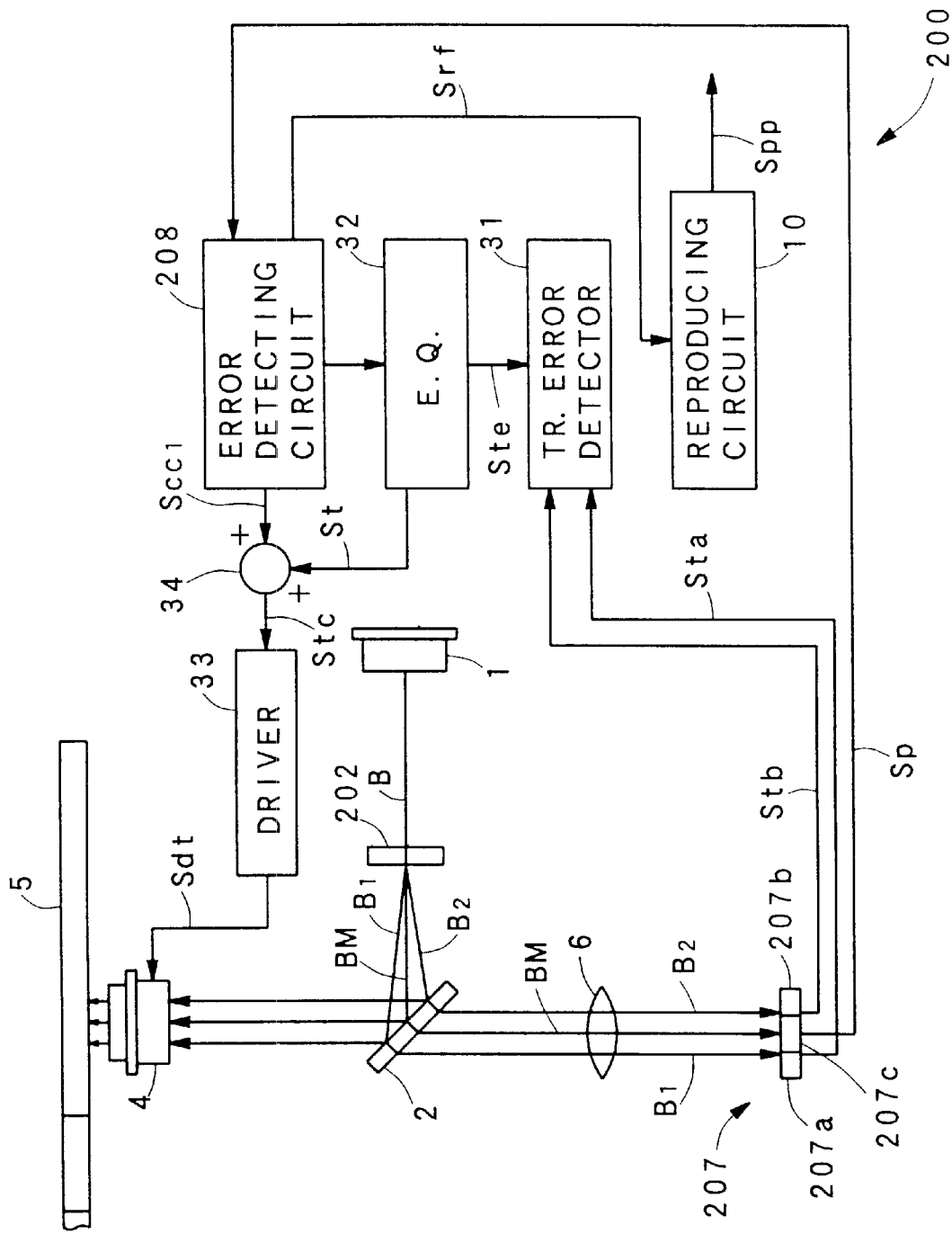
FIG. 8 is a block diagram showing a tracking servo control system of a second embodiment of the present invention.

FIG. 8 shows a tracking servo control system 200 of the information reproducing apparatus of the second embodiment. In addition, in FIG. 8, the same constructional elements as those in FIG. 1 carry the same reference numbers, and explanations about those elements are omitted.

The tracking servo control system 200 is a servo control system to compensate a tracking error, which is caused by a difference between the spot position of a light beam B and a track position on an optical disk 5. As shown in FIG. 8, the tracking servo control system 200 has a laser diode 1, a polarizing beam splitter 2, a diffraction grating 202, an objective 4, the optical disc 5, a collective lens 6, a detector 207, an error detecting circuit 208, a driver 33, a reproducing circuit 10, a tracking error detecting circuit 31, an equalizer 32 and an adder 34. The detector 207 has a main detecting portion 207c and a couple of sub detecting potions 207a and 207b.

The laser diode 1 generates the light beam B to be used for reproducing information recorded on the optical disk 5, and outputs this light beam B to the diffraction grating 202.

The diffraction grating 202 divides the light beam B into a main beam BM, which is used for reproducing information recorded on the optical disk 5, and a couple of sub beams B1 and B2, which are used for generating a tracking error signal. Then, these beams are guided to the objective 4 by the polarizing beam splitter 2, and are focused on the optical disc 5 by the objective 4.

The main beam M and the sub beams B1 and B2 reflected by the optical disc 5 pass through the polarizing beam splitter 2. Then, the main beam is focused on the main detecting portion 207c of the detector 207, and the sub beams are focused on the sub detecting portions 207a and 207b of the detector 207, respectively. At this time, the intensity of each reflected beam has been modulated according to information which is recorded on the optical disk 5 as pits, and the polarization surface of each reflected beam has been rotated according to the pits.

The main detecting portion 207c generates a detection signal Sp corresponding to information recorded on the optical disk 5, and feeds this signal to the error detecting circuit 208. The sub detecting portion 207a generates a tracking signal Sta according to the sub beams B1. The sub detecting portion 207b generates a tracking signal Stb according to the sub beams B2. Then, theses tracking signals Sta and Stb are fed into the tracking error detecting circuit 31.

The tracking error detecting circuit 31 generates a tracking error signal by using a 3 beam method. Concretely, the tracking error detecting circuit 31 calculates the difference between the tracking signals Sta and Stb. The difference is fed as the tracking error signal Ste into the equalizer 32.

The equalizer 32 corrects the frequency property of the tracking error signal Ste. Then, the resultant signal is fed as a corrected tracking error signal St into the adder 34.

The error detecting circuit 208 generates an RF signal Srf corresponding to information recorded on the optical disk 5 according to the detection signal Sp, and outputs this signal to the reproducing circuit 10. The reproducing circuit 10 decodes the RF signal Srf. The decoded signal is output as a reproducing signal Spp.

While the aforementioned operation is being carried out, the error detecting circuit 208 detects a tracking error, which is caused by a difference between location of the main beam BM and location of the track, from the RF signal Srf. Then, this tracking error is fed as a deviation signal Scc1 into the adder 34. The corrected tracking error signal St is added to the deviation signal Scc1, and the resultant signal is fed as a tracking deviation signal Stc into the driver 33. The driver 33 generates the tracking driving signal Sdt according to the tracking deviation signal Stc. Then, the tracking driving signal Sdt is fed into a tracking actuator (which is not depicted). As a result, if there is a tracking error, the objective 4 is moved by the tracking actuator along the surface of the optical disk 5 so that the tracking error is reduced.

In the tracking error control system 200, compensation of a tracking error is achieved by two ways. One way is a coarse control, and the other way is a fine control. The coarse control is mainly achieved by using the corrected tracking error signal St. The fine control is achieved by using the deviation signal Scc1. The tracking error cannot be completely removed by only using the corrected tracking error signal St. However, by using both the corrected tracking error signal St and the deviation signal Scc1, the tracking error can be completely removed.

Figure 9:
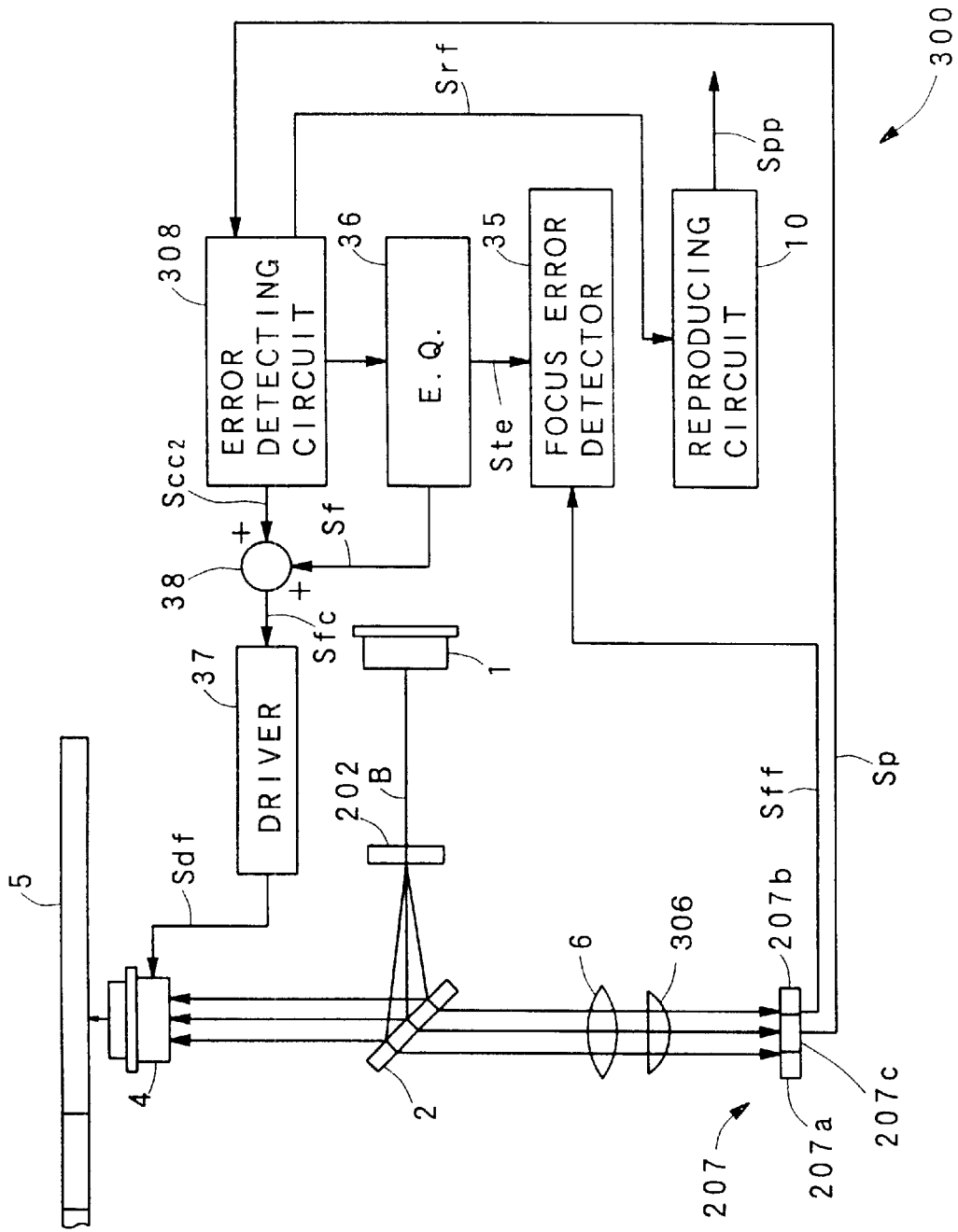
FIG. 9 is a block diagram showing a focus servo control system of the second embodiment.

FIG. 9 shows a focus servo control system 300 of the information reproducing apparatus of the second embodiment. In addition, in FIG. 9, the same constructional elements as those in FIG. 8 carry the same reference numbers and explanations about those elements are omitted.

The focus servo control system 300 is a servo control system to compensate a focus error, which is caused by a difference between the focal distance of the light beam B and the actual distance from the light emission point to the optical disk. The distance from the light emission point to the optical disk means the distance between the objective 4 and the optical disk 5.

As shown in FIG. 9, the focus servo control system 300 has a laser diode 1, a polarizing beam splitter 2, a diffraction grating 202, an objective 4, the optical disk 5, a collective lens 6, a detector 207 and a reproducing circuit 10. These elements are the same as those of the tracking servo control system 200. The focus servo control system 300 further has a cylindrical lens 306, an error detecting circuit 308, a driver 37, a focus error detecting circuit 35, an equalizer 36 and an adder 38. The light receiving surface of the main detecting portion 7c of the detector 7 is divided into four sectorial parts each having the same area, in order to generate a focus error detection signal Sff, as described later.

The main beam BM reflected by the optical disk 5 passes through the polarizing beam splitter 2, the collective lens 6 and the cylindrical lens 306, and reaches the detector 7. The cylindrical lens 306 gives astigmatism to the main beam BM.

The main beam BM is received by the light receiving surface of the main detecting portion C. In response to this, each sectorical part of the light receiving surface outputs a signal corresponding to the received main beam BM. The detector 7 generates a detection signal Sp by adding all of the signals output from the respective sectorical part. The detection signal Sp is fed into the error detecting circuit 308.

The detector 7 also generates a focus error detection signal Sff by using a astigmatism method. Concretely, the sum of two signals output from two sectorical parts which are arranged opposite to each other is calculated. This calculation is performed with respect to two different couples of sectorical parts. Next, the difference between the two sums is calculated. The difference is fed as the focus error detection signal Sff into the focus error detecting circuit 35.

The focus error detecting circuit 35 generates a focus error signal Sfe by using the astigmatism method, according to the focus error detection signal Sff. Information with respect to the focus error is included in the focus error signal Sfe. Then, the focus error signal Sfe is fed into the equalizer 36. In the equalizer 36, the frequency property of the focus error signal Sfe is corrected, and fed as a corrected focus error signal Sf into the adder 38.

The error detecting circuit 308 generates the RF signal Srf corresponding to information recorded on the optical disk 5, according to the detection signal Sp. The RF signal Srf is decoded by the reproducing circuit 10, and output as the reproducing signal Spp.

While the aforementioned operation is being carried out, the error detecting circuit 308 detects a focus error, which is caused by the fact that the main beam BM is not in focus, from the RF signal Srf. Then, the resultant signal is fed as the deviation signal Scc2 into the adder 38. In the adder 38, the deviation signal Scc2 is added to the corrected focus error signal Sf, and the resultant signal is fed as a focus deviation signal Sfc into the driver 37. The driver 37 generates the focus driving signal Sdf according to the focus deviation signal Sdf. Then, the focus deviation signal Sdf is fed into a focus actuator (which is not depicted). Therefore, if there is a focus error, the objective 4 is moved by the focus actuator in the perpendicular direction to the surface of the optical disk 5 so that the focus error is reduced.

In the focus error control system 300, compensation of a focus error is achieved by two ways. One way is a coarse control, and the other way is a fine control. The coarse control is mainly achieved by using the corrected focus error signal Sf. The fine control is achieved by using the deviation signal Scc2. The focus error cannot be completely removed by only using the corrected focus error signal Sf. However, by using both the corrected focus error signal Sf and the deviation signal Scc2, the focus error can be completely removed.

Figure 10:
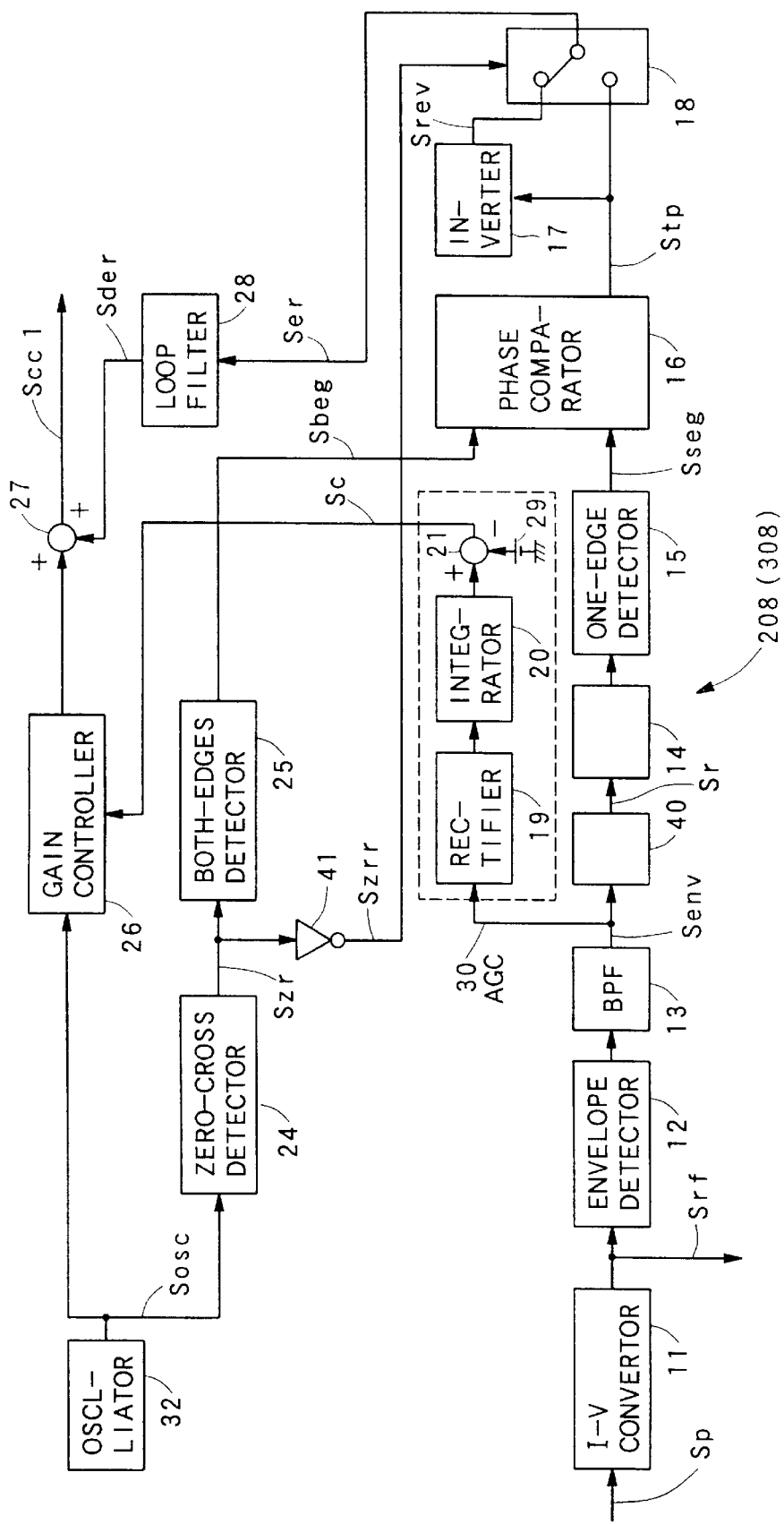
FIG. 10 is a block diagram showing an error detecting circuit of the second embodiment.

Next, FIG. 10 shows the construction of the error detecting circuit 208 of the tracking servo control system 200 in detail. In FIG. 10, the same constructional elements as those in FIG. 2 carry the same reference numbers and explanations about those elements are omitted.

As shown in FIG. 10, the error detecting circuit 208 has an I-V converter 11, an envelope detector 12, a BPF 13, a couple of zero-cross detectors 14 and 24, a one-edge detector 15, a phase comparator 16, an inverter 16, a switch 18, an AGC 30, a both-edges detector 25, a gain controller 26, the adder 27, a loop filter 28, an oscillator 32 and an inverter 40.

When there is no tracking error, the error detecting circuit 208 operates as follows.

The oscillator 32 outputs a basic signal Sosc having a predetermined frequency f0. The basic signal Sosc is fed into the gain controller 26, and next fed into the adder 27, and further fed as the deviation signal Scc1 to the adder 34, as shown in FIG. 8.

Figure 11:
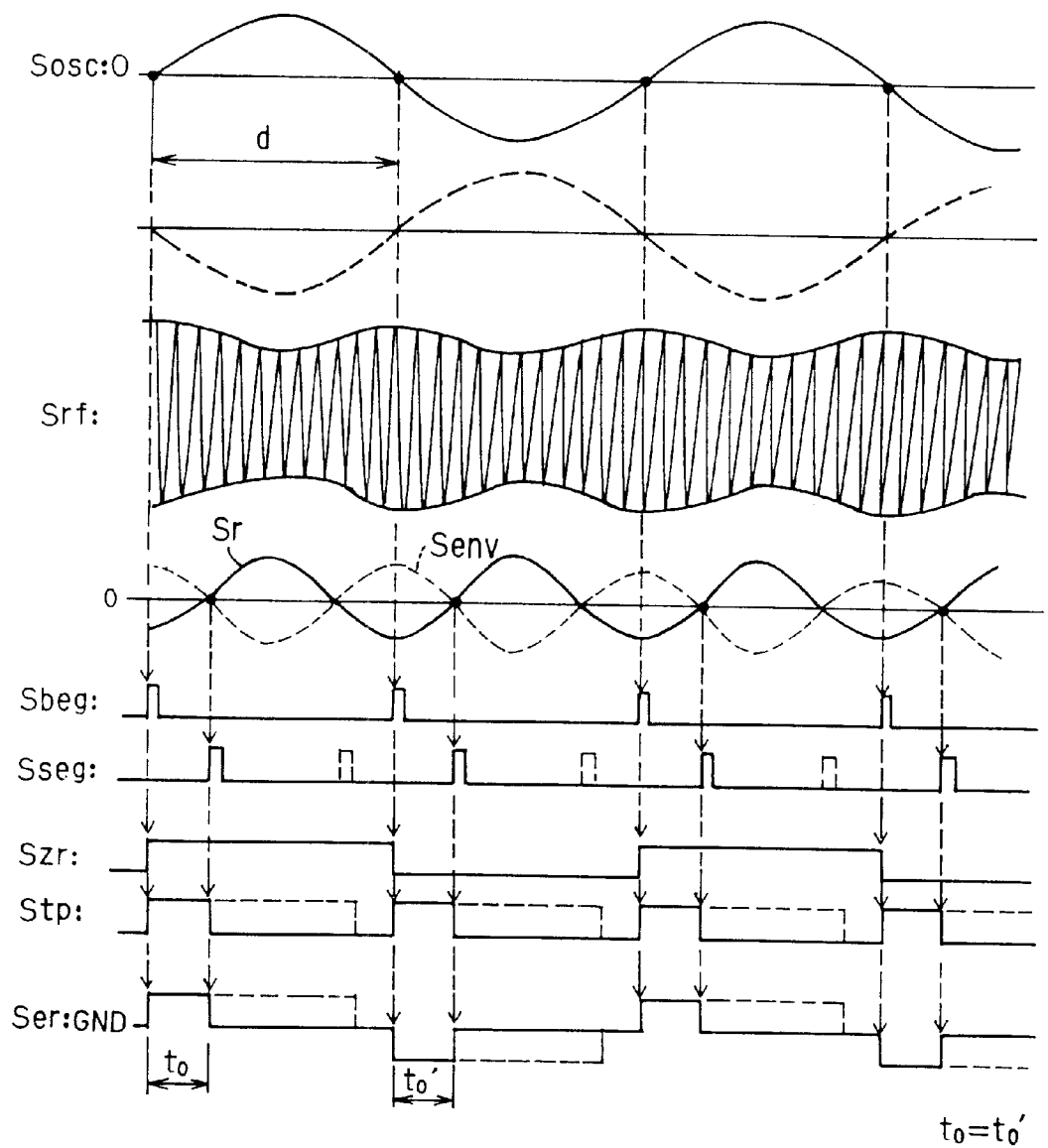
FIGS. 11 through 13 are diagrams each showing a relationship between signals in time in the error detecting circuit of the second embodiment.

The zero-cross detector 24 detects the zero cross point of the basic signal Sosc, and generates the detection signal Szr including information with respect to the timing of the zero cross point, as shown in FIG. 11. The detection signal Szr is fed into the both-edges detector 25 and the inverter 41. The detection signal Szr is inverted by the inverter 41, and fed as an inverted detection signal Szrr into the switch 18. The both-edges detector 25 generates an edge signal Sbeg according to the detection signal Szr (FIG. 11), and feeds it to the phase comparator 16.

The detection signal Sp, which is input from the detector 7, is converted into the RF signal Srf by the I-V converter 11, and fed into the envelope detector 12 and the reproducing circuit 10.

Here, the wave form of the RF signal Srf is shown in FIG. 11. As seen from FIG. 11, the frequency of the RF signal Srf is twice as high as that of the basic signal Sosc. This is because the tracking servo control system 200 is a time lag system of second order. Furthermore, the phase of the RF signal Srf lags behind that of the basic signal Sosc by 180 degrees. That is, the RF signal Srf is synchronized with a lagged signal Soscd whose phase lags behind that of the basic signal Sosc by 180 degrees. This is because the tracking servo control system 200 is a time lag system of second order, and the frequency of the basic signal Sosc is high in order to keep the speed of response of the tracking servo control system 200 high.

Figure 4B:
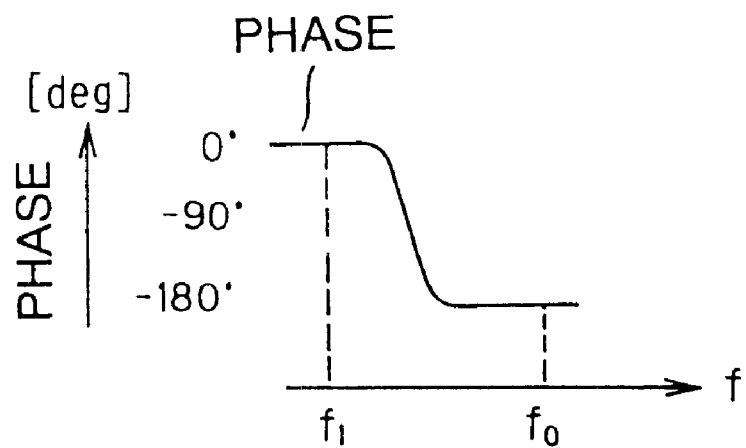

Generally, in the time lag system of second order, there is a certain relationship between the frequency of an input signal and the phase of an output signal, as shown in FIG. 4B. As seen from FIG. 4B, if the frequency of the input signal is higher than about f0, the phase of the output signal lags by 180 degrees. Furthermore, when the frequency of the input signal is in the range of about f1 to f0, the phase of the output signal varies according to the change of the frequency. However, if the frequency of the input signal is higher than about f0, the phase of the output signal becomes stable. In the tracking servo control system 200 of the second embodiment, the frequency of the basic signal Sosc is set at f0 in consideration of high speed response and stability of the phase lag of the RF signal Srf. Therefore, the phase of the RF signal Srf lags behind that of the basic signal Sosc by 180 degrees.

In FIG. 10, the envelope of the RF signal Srf is detected by the envelope detector 12 and the BPF 13, and fed as an envelope signal Senv into the rectifier 19 and the inverter 40. In the AGC 30, a control signal Sc is generated, as mentioned above. Then, the control signal Sc is fed into the gain controller 26. The gain controller 26 adjusts the gain of the basic signal Sosc according to the control signal Sc.

The inverter 40 inverts the polarity of the envelope signal Senv. Then, the resultant signal is fed as an inverted signal Sr into the zero-cross detector 14. Then, the zero cross point of the inverted signal Sr is detected by the zero-cross detector 14, and an edge signal Sseg is generated by the one-edge detector 15, as shown in FIG. 11. Then, the edge signal Sseg is fed into the phase comparator 16.

The phase comparator 16 compares the phase of the edge signal Sbeg and that of the edge signal Sseg, and generates a phase signal Stp. The phase comparator 16 feeds the phase signal Stp to the switch 18 and the inverter 17. The inverter 17 inverts the polarity of the phase signal Stp. Then, the resultant signal is fed as an inverted signal Srev from the inverter 17 into the switch 18. The output of the the switch 18 is switched according to the inverted detection signal Szrr.

Here, the reason why the inverters 40 and 41 are used in the error detecting circuit 208 will be explained. As mentioned above, the phase of the RF signal Srf lags behind that of the basic signal Sosc by 180 degrees in the tracking servo system 200. Therefore, if the envelope signal Senv is directly applied to the zero-cross detector 14 without inputting into the inverter 40, the edge signal Sseg having a wave form that is depicted by a broken line in FIG. 11 is generated. As a result, the phase signal Stp having a wave form that is depicted by a broken line in FIG. 11 is generated. As seen from the broken line of the phase signal Stp, this phase signal Stp has pulses each having long width. If such a phase signal Stp having long width pulses is used, it becomes difficult to discriminate the adjacent pulses of the phase signal Stp in the operations of the switch 18 and the loop filter 28 (because the interval between the adjacent pulses is too short). Therefore, the edge signal Sseg is generated by using the inverted signal Sr, which is the inverted signal of the envelope signal Senv, and therefore, the inverted detection signal Szrr, which is the inverted signal of the detection signal Szr, is used in the error detecting circuit 208. As a result, an error signal Ser, where each pulse can be discriminated clearly, is generated.

As shown in FIG. 11, if there is no tracking error, the width (t0) of each positive pulse is equal to the width (t0') of each negative pulse, in the wave form of the error signal Ser. Therefore, if the average of the voltage of the error signal Ser is calculated by the loop filter 28, the level of the resultant signal Sder is zero. As a result, no dc voltage is added to the basic signal Sosc by the adder 27.

Next, when there is a tracking error, the error detecting circuit 8 operates as follows.

Figure 12:
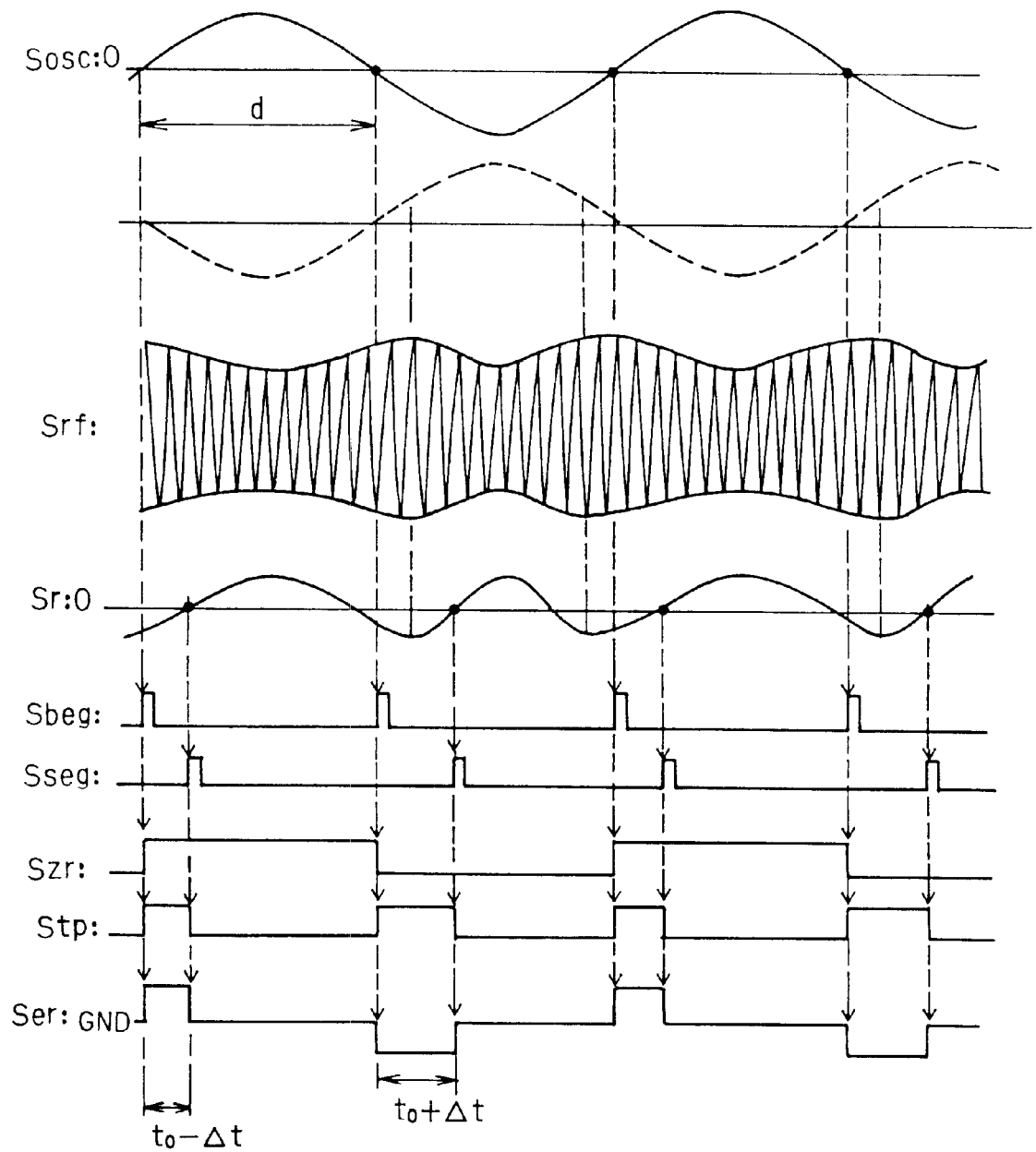

If there is a tracking error in one direction, for example, if location of the light spot is offset from the location of the track in the inner circumferential direction, the wave form of the RF signal Srf changes, as shown in FIG. 12. This reason will be explained. If there is no tracking error, the amplitude of the RF signal becomes maximum when the level of the lagged signal Soscd is zero, and the wave form of the amplitude of the RF signal Srf is symmetrical. Therefore, if there is no tracking error, the peak point and the zero cross point appear at regular intervals in the wave form of the envelope signal Senv, as shown in FIG. 11.

In contrast, if there is a tracking error, the amplitude of the RF signal Srf becomes maximum when the level of the lagged signal Soscd is not zero. Therefore, if there is a tracking error, the timing of the peak point or the zero cross point of the envelope signal Senv does not match the timing that the lagged signal Soscd becomes zero, so that the peak point or the zero cross point does not appear at regular intervals in the wave form of the envelope signal Senv, as shown in FIG. 12 or 13.

If the wave form of the RF signal Srf (envelope signal Senv) changes, the timing that the short pulse of the edge signal Sseg rises shifts by ±Δt, as shown in FIG. 12. As a result, in the error signal Ser, the width of the positive pulse becomes short by Δt (t0−Δt), and the width of the negative pulse becomes long by +Δt (t0+Δt). As a result, in the error signal Ser, the width of the positive pulse is shorter than that of the negative pulse. Therefore, the average of the voltage of the error signal Ser becomes a negative number, so that a negative dc voltage is obtained from the loop filter 28. Consequently, if there is a tracking error in the inner circumferential direction, the negative dc voltage which corresponds to the amount of the tracking error is added to the basic signal Sosc by the adder 27, and this basic signal Sosc is fed as the deviation signal Scc1 into the adder 34.

When the driver 33 receives this deviation signal Scc1 (tracking deviation signal Stc), the driver 33 recognizes the amount of the tracking error and the direction of the tracking error on the basis of the deviation signal Scc1, and generates the driving signal Sdt so as to eliminate the tracking error. As a result, the light spot is shifted in the outer circumferential direction of the optical disk 5 according to the driving signal Sdt, so that the tracking error is eliminated.

Figure 13:
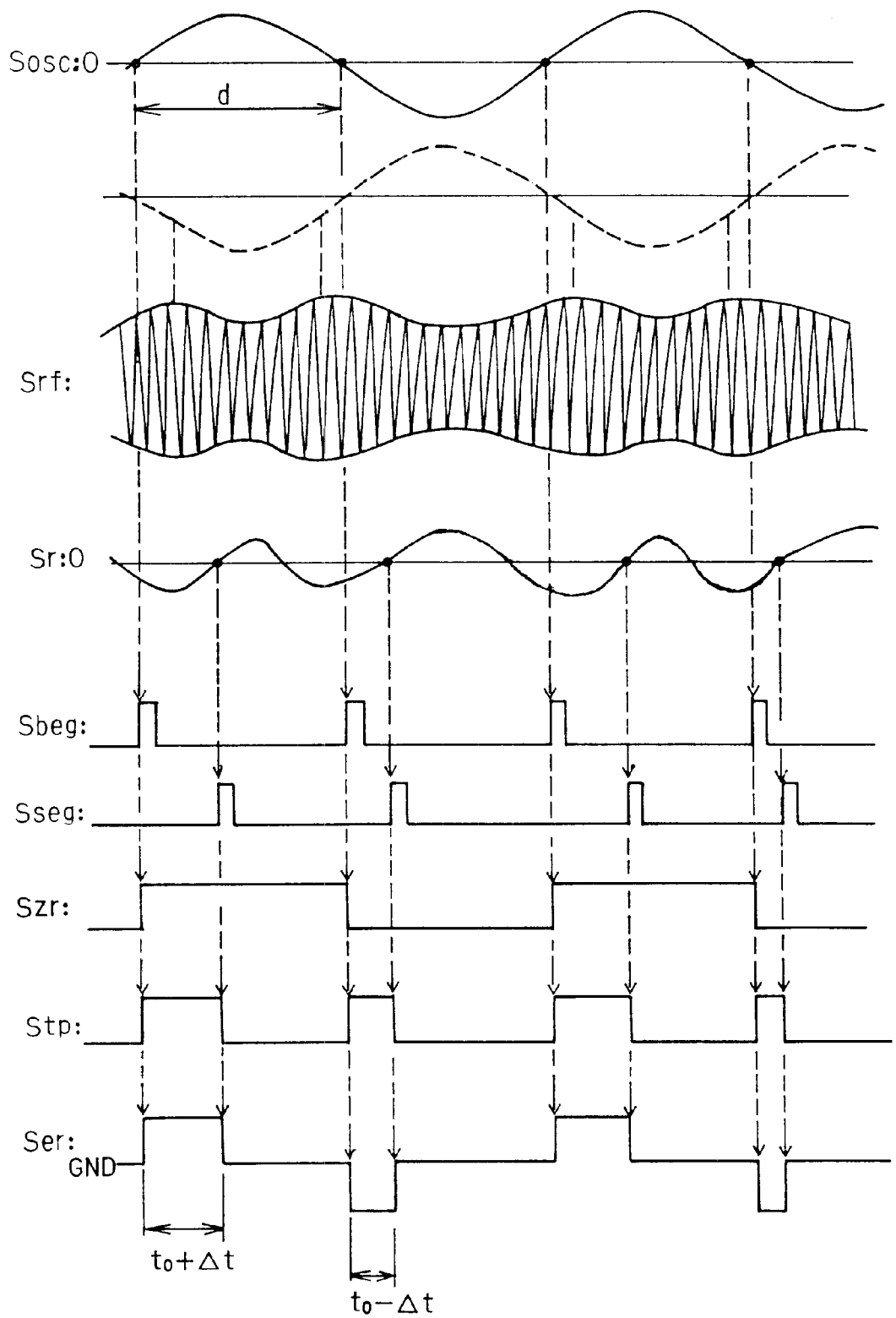

If there is a tracking error in the opposite direction, for example, if location of the light spot is offset from the location of the track in the outer circumferential direction, the wave form of the RF signal Srf changes, as shown in FIG. 13.

If the wave form of the RF signal Srf (envelope signal Senv) changes, the timing that the short pulse of the edge signal Sseg rises shifts by ±Δt, as shown in FIG. 13. Here, the direction of the shift of the short pulse is opposite to that of the shift of the short pulse shown in FIG. 12. As a result, in the error signal Ser, the width of the positive pulse becomes long by +Δt (t0+Δt), and the width of the negative pulse becomes short by −Δt (t0−Δt). As a result, in the error signal Ser, the width of the positive pulse is longer than that of the negative pulse. Therefore, the average of the voltage of the error signal Ser becomes a positive number, so that a positive dc voltage is obtained from the loop filter 28. Consequently, if there is a tracking error in the outer circumferential direction, the positive dc voltage which corresponds to the amount of the tracking error is added to the basic signal Sosc by the adder 27, and this basic signal Sosc is fed as the deviation signal Scc1 into the adder 34.

When the driver 33 receives this deviation signal Scc1 (tracking deviation signal Stc), the driver 33 recognizes the amount and direction of the tracking error on the basis of the deviation signal Scc1, and generates the driving signal Sdv so as to eliminate the tracking error. As a result, the light spot is shifted in the inner circumferential direction of the optical disk 5 according to the driving signal Sdt, so that the tracking error is eliminated.

The error detection circuit 308 of the focus servo control system 300 has the same construction as that of the error detection circuit 208 of the tracking servo control circuit 200, except for the frequency of the basic signal Sosc, and the center frequency of the BPF 13. Since the frequency of the basic signals Sosc used in the tracking servo control system 200 is different from that used in the focus servo control system 300, the error detecting circuit 208 can detects offset with respect to the tracking error, discriminating it from the offset with respect to the focus error. Similarly, the error detecting circuit 308 can detects offset with respect to the focus error, discriminating it from the offset with respect to the tracking error.

According to the tracking servo control system 200 and the focus servo control system 300 of the second embodiment of the present invention, the amount and direction of the tracking error and focusing error can be detected on the basis of changes of the wave form of the RF signal Srf. Therefore, if the degree of the tracking error or the focusing error is different between the inner circumference and the outer circumference of the optical disk, or if the degree of the tracking error or the focus error is different in each optical disk, the amount and direction of the tracking error and the focus error can be detected accurately. As a result, the tracking error and the focus error can be completely removed.

Furthermore, as the amount and direction of the tracking error and the focus error can be detected on the basis of change of the wave form of the RF signal Srf, neither complex calculation nor leaning function is required. Therefore, the amount and direction of the the tracking error and the focus error can be detected rapidly and accurately by the simple construction.

Furthermore, as the change of the wave form of the RF signal Srf is detected by comparing the timing that the level of the basic signal Sosc reaches a zero level with the timing that the level of the envelope signal Senv reaches a zero level, the amount and direction of the the tracking error and the focus error can be detected rapidly and accurately by the simple construction.

In addition, in the aforementioned second embodiment, the two error detecting circuits 208 and 308 are used in the tracking servo control system 200 and the focus servo control system 300, respectively. However, one common error detecting circuit may be used for both the tracking servo control system 200 and the focus servo control system 300. In this case, the output of the error detecting circuit is switched by using time dividing method, and the tracking servo control and the focus servo control are alternately carried out.

III. Third Embodiment

Next, a third embodiment of the present invention will be described with reference to FIGS. 14 through 17. In the aforementioned first and second embodiments, the error signal Ser is generated by comparing the timing that the level of the basic signal Sosc becomes zero with the timing that the level of the envelope signal Senv (or inverted signal Sr) changes from negative to positive. In contrast, in the third embodiment set forth hereinafter, the error signal Ser is generated by comparing the timing that the level of the basic signal Sosc becomes zero with the timing that the level of the envelope signal Senv becomes its peak.

In the description set forth hereinafter, the present invention is embodied in a tilt servo control system of an information reproducing apparatus. As the construction of the tilt servo control system of the this embodiment is the same as that of the tilt servo control system of the first embodiment except for the error detecting circuit, the construction and the operation of the error detecting circuit will be described.

Figure 14:
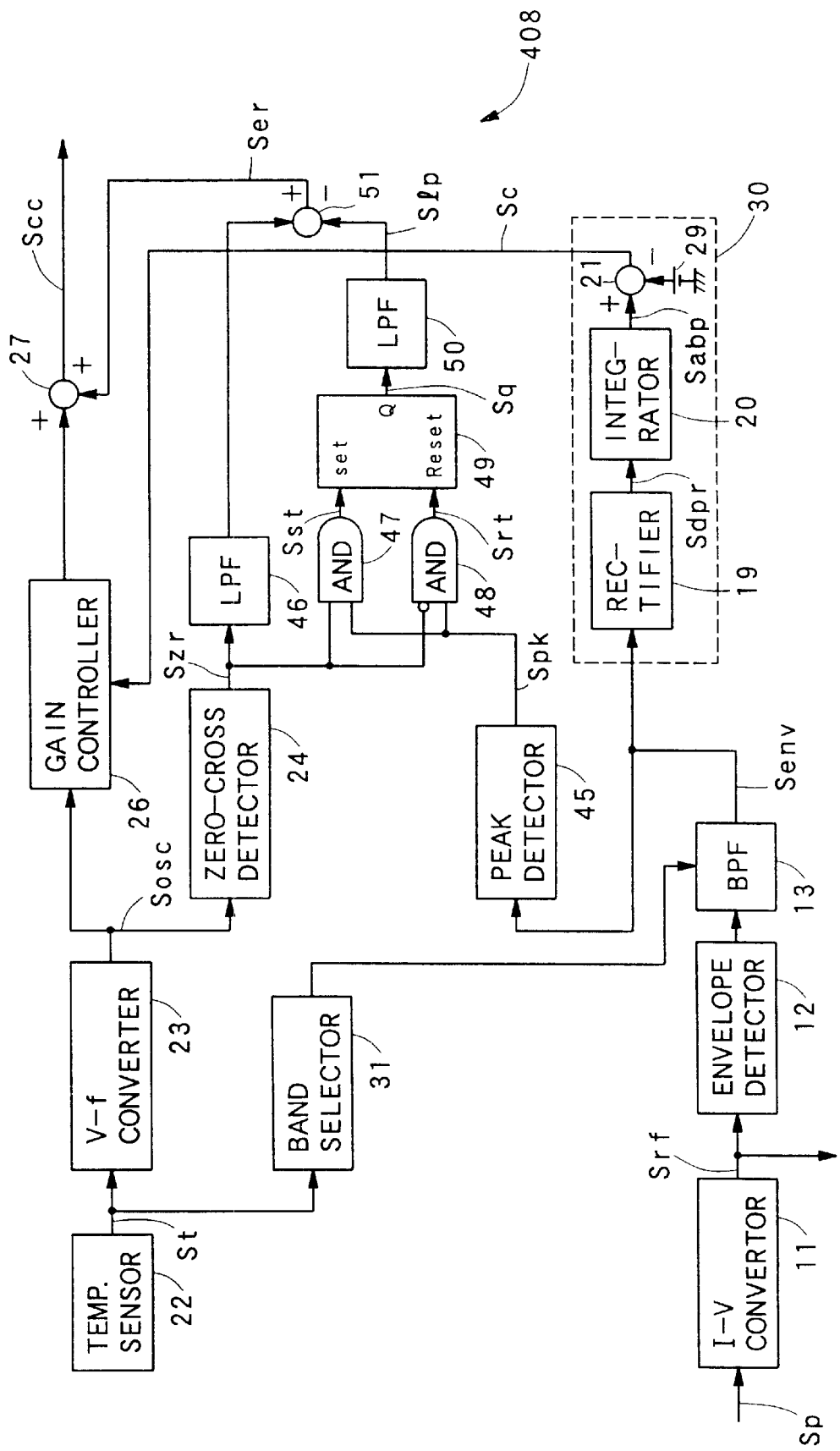
FIG. 14 is a block diagram showing an error detecting circuit of a third embodiment of the present invention.

FIG. 14 shows the construction of an error detecting circuit 408 of the third embodiment of the present invention. In FIG. 14, the same constructional elements as those in FIG. 2 carry the same reference numbers, and explanation about those elements are omitted.

As shown in FIG. 14, the error detecting circuit 408 has an I-V converter 11, an envelope detector 12, a BPF 13, a zero-cross detector 24, an AGC 30, a temperature sensor 22, a V-f converter 23, a gain controller 26, an adder 27, a loop filter 28 and a band selector 31. These elements are the same as those of the error detecting circuit 8 of the first embodiment. Further, the error detecting circuit 408 has a peak detector 45, a couple of AND circuits 47 and 48, a flip flop circuit of RS type (RS-FF) 49, a couple of low pass filters (LPFs) 49 and 50, and a subtracter 51.

If there is no tilt between the optical disc 5 and the light beam B, the error detecting circuit 408 operates as follows.

The V-f converter 23 outputs a basic signal Sosc according to an ambient temperature detected by the temperature sensor 22. This basic signal Sosc is fed into the gain controller 26 and next fed into the adder 27, and then outputs as a deviation signal Scc to the LC panel control circuit.

Figure 15:
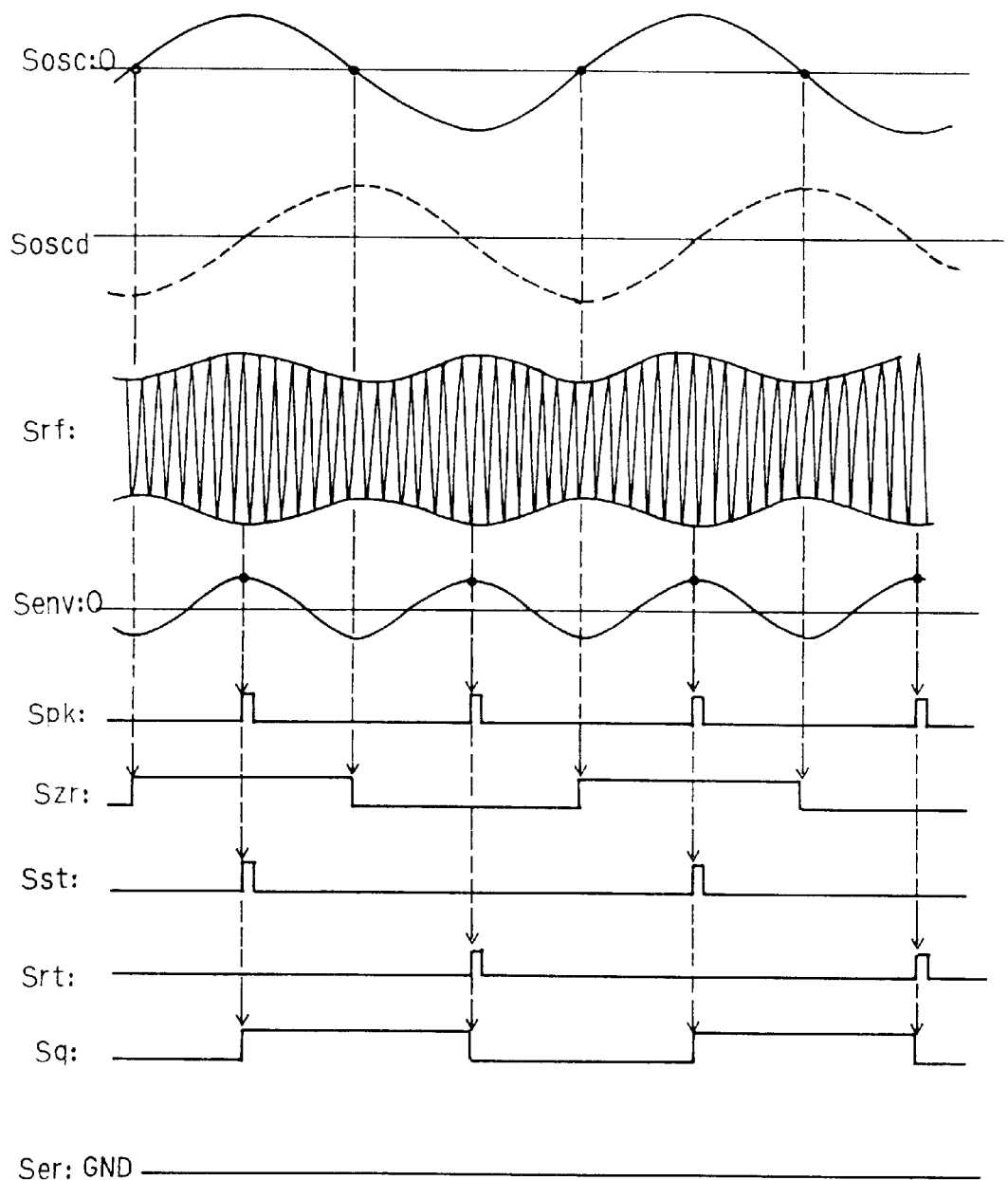
FIGS. 15 through 17 are diagrams each showing a relationship between signals in time in the error detecting circuit of the third embodiment.

The basic signal Sosc is also output from the V-f converter 23 to the zero-cross detector 24. The zero-cross detector 24 detects the zero cross points of the basic signal Sosc, and generates a detection signal Szr including information with respect to the timing of the zero cross point of the basic signal Sosc, as shown in FIG. 15. Then, the detection signal Szr is fed into the LPF 46, and the input terminals of the AND circuits 47 and 48. When the detection signal Szr is input into the AND circuit 48, the polarity of the detection signal Szr is inverted.

The LPF 46 generates the average of the detection signal Szr. Then, the average of the detection signal Szr is fed as an average detection signal Sezr into the subtracter 51.

The detection signal Sp, which is input to the I-V converter 11, is converted into an RF signal Srf by the I-V converter 11. Then, the RF signal Srf is fed into the envelope detector 12 and the reproducing circuit. The wave form of the RF signal Srf is shown in FIG. 15. As seen from FIG. 15, the wave form of the RF signal Srf is the same as that in FIG. 3.

The RF signal Srf is fed into the envelope detector 12, and next fed into the BPF 13, and further fed as a envelope signal Senv (which is depicted in FIG. 15) into both the rectifier 19 and the peak detector 45.

The operations of the rectifier 19, the integrator 20, the reference voltage generator 29, the subtracter 21 and the gain controller 26 are the same as those in FIG. 2.

The peak detector 45 detect the timing that the level of the envelope signal Senv becomes its peak, and generates a peak signal Spk. As shown in FIG. 15, the peak signal has short pulses which rise at the timing that the level of the envelope signal Senv becomes its peak. Then, the peak signal Spk is fed into the AND circuits 47 and 48.

The AND circuit 47 calculates the logical product of the peak signal Spk and the detection signal Szr. Then, the resultant signal is fed as a setting signal Sst (which is depicted in FIG. 15) into the set terminal of the RS-FF 49.

The AND circuit 48 calculates the logical product of the inverted detection signal and the peak signal Spk. Then, the resultant signal is fed as a rest signal Srt (which is depicted in FIG. 15) into the reset terminal of the RS-FF 49.

The RS-FF 49 changes the output level from the low level to the high level when the level of the set signal Sst becomes high. Further, the RS-FF 49 changes the output level from the high level to the low level when the level of the reset signal Srt becomes high. The output of the RS-FF 49 is fed as a peak width signal Sq (which is depicted in FIG. 15) into the LPF 50. The LPF 50 generates the average of the peak width signal Sq. Then, this average is fed as average peak width signal Slq into the subtracter 51.

As shown in FIG. 15, if there is no tilt, the envelope signal Senv is synchronized with the lagged signal Soscd and the frequency of the envelope signal Sevn is twice as high as that of the lagged signal Soscd, as mentioned above. Therefore, the wave form of the detection signal Szr is the same as that of the peak width signal Sq, and the phase of the peak width signal Sq lags behind that of the detection signal Szr by ¼ cycle.

Therefore, if the average peak width signal Slq, which is the average of the peak width signal Sq, is subtracted from the average detection signal Sezr, which is the average of the detection signal Szr, the resultant signal, namely the error signal Ser is zero in level, as shown in FIG. 15. As a result, in the adder 27, no dc voltage is added to the basic signal Sosc.

Next, when there is a tilt, the error detecting circuit 408 operates as follows.

If there is a tilt in one direction (negative direction), the wave form of the RF signal Srf changes, as shown in FIG.

16. If the wave form of the RF signal Srf changes, the wave form of the envelope signal Senv also changes. Therefore, in the peak width signal Sq, the width of the pulses become short. As a result, the time period during which the level of the peak width signal Sq is high becomes shorter than the time period during which the level of the peak width signal Sq is low.

Figure 16:
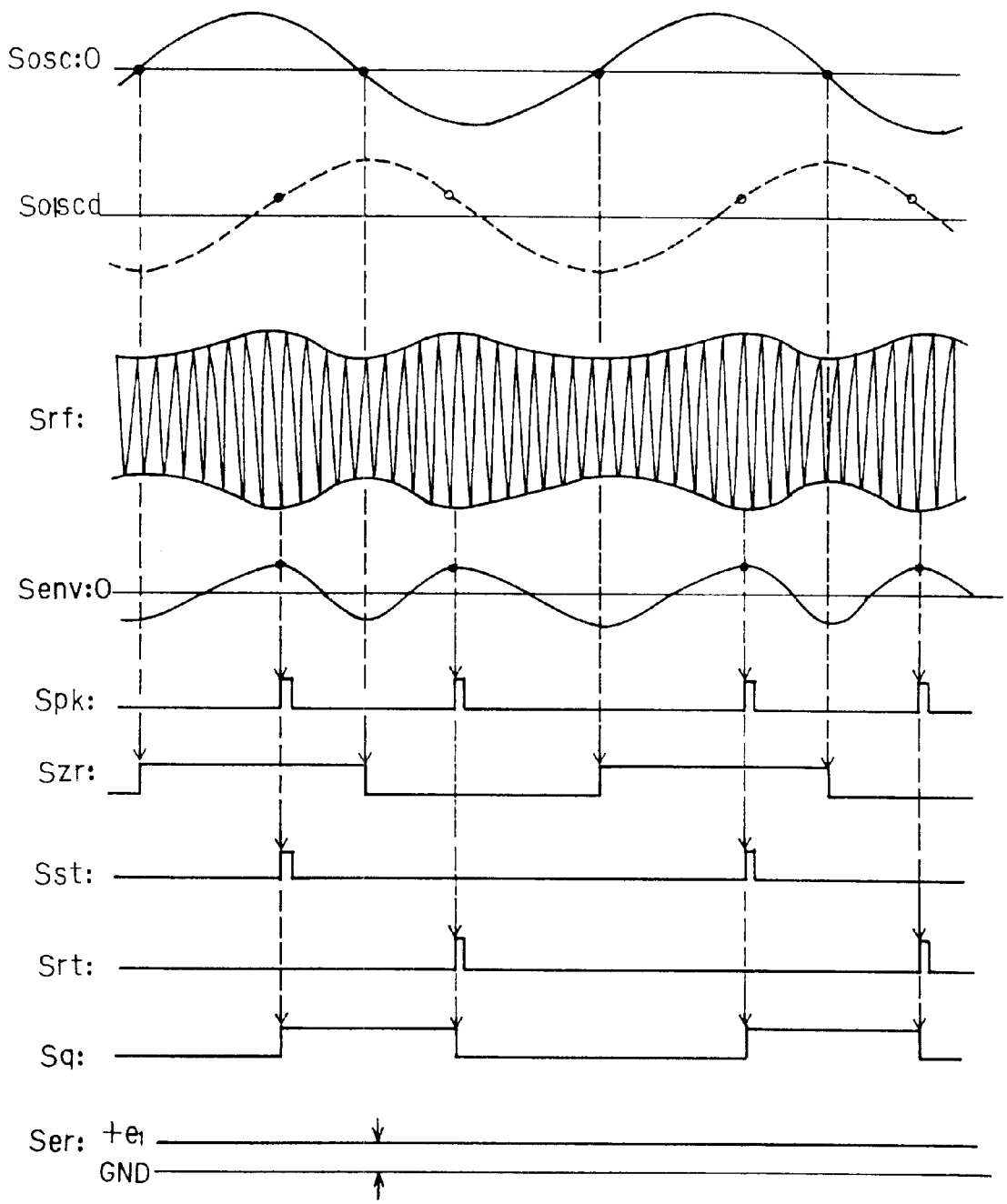

Therefore, if the average peak width signal Slq is subtracted from the average detection signal Sezr by the subtracter 51, the resultant signal, namely the error signal Ser has a positive level, as shown in FIG. 16.

Consequently, if there is a tilt in the negative direction, the positive dc voltage which corresponds to the amount of the tilt is added to the basic signal Sosc by the adder 27. This basic signal Sosc is fed as the deviation signal Scc into the LC panel control circuit, and the wavefront aberration is compensated.

Figure 17:
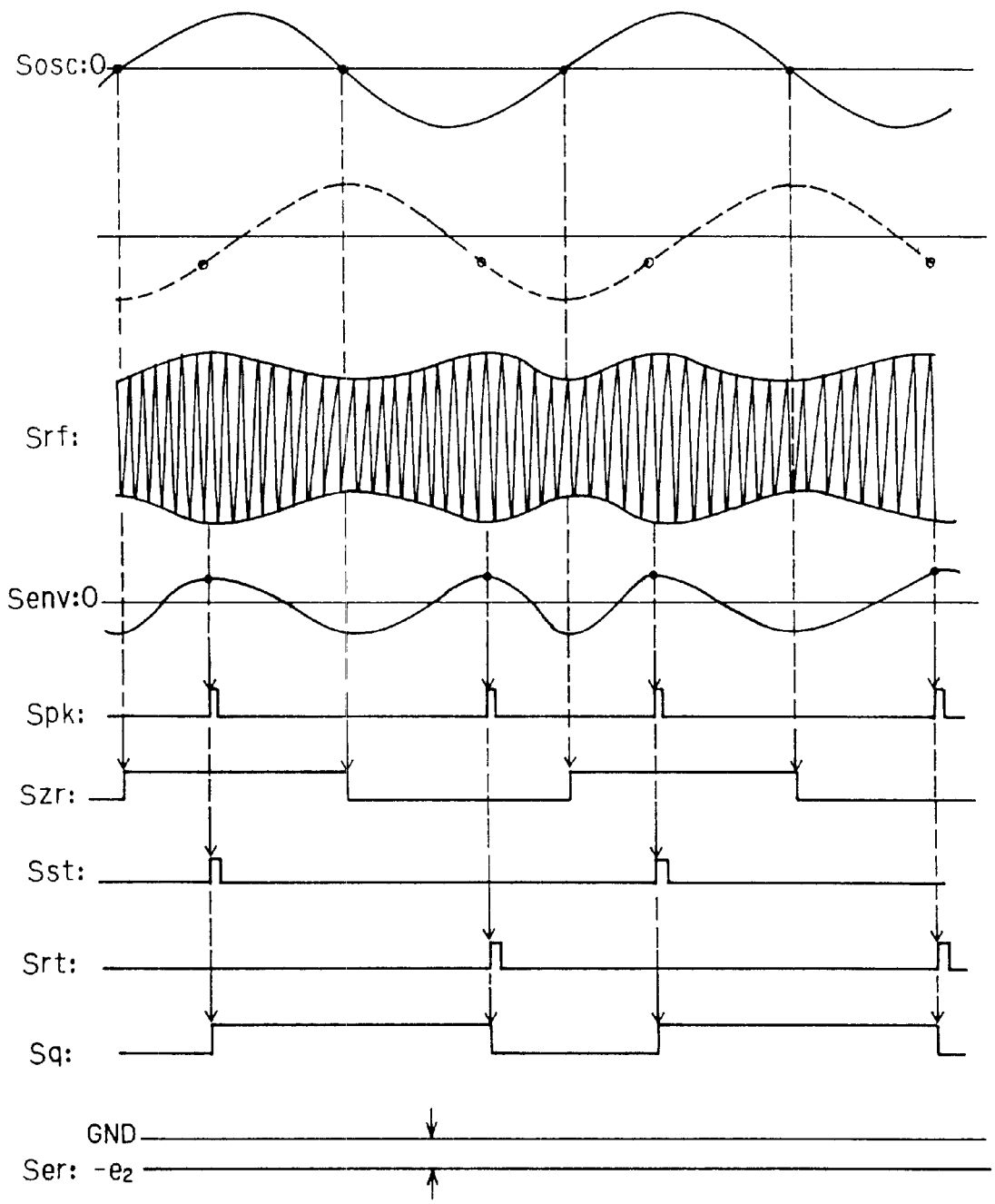

If there is a tilt in the opposite direction (positive direction), the wave form of the RF signal Srf changes, as shown in FIG. 17. Here, the wave form of the RF signal Srf shown in FIG. 17 is different from that shown in FIG. 16. If the wave form of the RF signal Srf changes, the wave form of the envelope signal Senv also changes, and therefore, in the peak width signal Sq, the width of each pulse becomes long. As a result, the time period during which the level of the peak width signal Sq is high becomes longer than the time period during which the level of the peak width signal Sq is low.

Therefore, if the average peak width signal Slq is subtracted from the average detection signal Sezr by the subtracter 51, the resultant signal, namely the error signal Ser has a negative level, as shown in FIG. 16.

Consequently, if there is a tilt in the positive direction, the negative dc voltage which corresponds to the amount of the tilt is added to the basic signal Sosc by the adder 27. This basic signal Sosc is fed as the deviation signal Scc into the LC panel control circuit, and the wavefront aberration is compensated.

According to the tilt servo control system of the third embodiment of the present invention, the amount and direction of the tilt can be detected accurately, if the degree of the tilt is different between the inner circumference and the outer circumference of the optical disk, or if the degree of the tilt is different in each optical disk. As a result, the tilt can be completely eliminated.

Furthermore, as the amount and direction of the tilt can be detected on the basis of change of the wave form of the RF signal Srf, neither complex calculation nor leaning function is required. Therefore, the amount and direction of the tilt can be detected rapidly and accurately by the simple construction.

Furthermore, as the changes of the wave form of the RF signal is detected by comparing the timing that the level of the basic signal Sosc reaches a zero level with the timing that the level of the envelope signal Senv reaches its peak level, the amount and direction of the tilt can be detected rapidly and accurately by the simple construction.

IV. Fourth Embodiment

Figure 18:
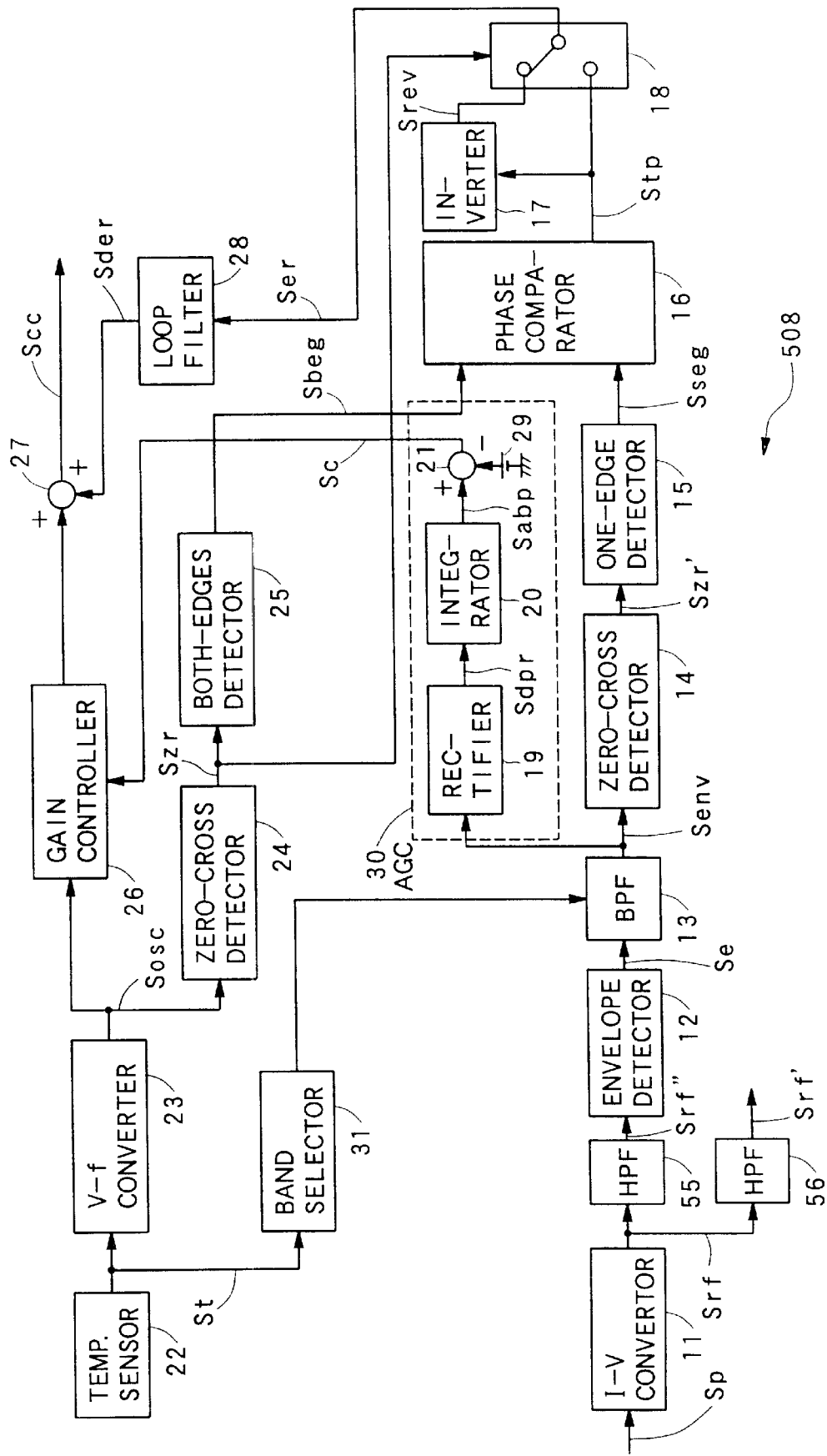
FIG. 18 is a block diagram showing an error detecting circuit of a fourth embodiment of the present invention.

Next, a fourth embodiment of the present invention will be described with reference to FIGS. 18 and 19.

The construction of the error detecting circuit 508 of this embodiment is the same as that of the error detecting circuit 8 of the first embodiment, except that two different high pass filters (HPF) 55 and 56 are added.

Figure 19A:
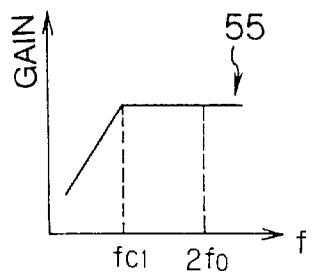
FIGS. 19A through 19C are diagrams each showing a frequency property of a filter installed in the error detecting circuit of the fourth embodiment.

The HPF 55 is connected between the I-V converter 11 and the envelope detector 12. The cut-off frequency fc1 of the HPF 55 is set in order to pass only the frequency that is twice as high as and higher than that of the basic signal Sosc. The frequency property of the HPF 55 is shown in FIG. 19A. Therefore, unnecessary frequency components for the error detecting circuit 508 is eliminated from the RF signal Srf by the HPF 55. As a result, the amount and direction of the tilt can be accurately detected.

Figure 19B:
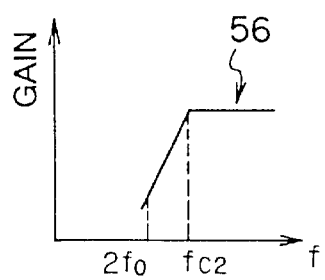

The HPF 56 is connected between the I-V converter 11 and the reproducing circuit 10. The cut-off frequency fc2 of the HPF 56 is twice higher than the frequency of the basic signal Sosc, in order to reduce the component having frequency that is twice as high as that of the basic signal Sosc, from the RF signal Srf. The frequency property of the HPF 56 is shown in FIG. 19B. Therefore, unnecessary frequency components for the reproducing circuit 10 is reduced by the HPF 56. As a result, the signal-to-noise ratio with respect to the RF signal Srf is improved, so that performance of the information reproducing apparatus is improved.

Figure 19C:
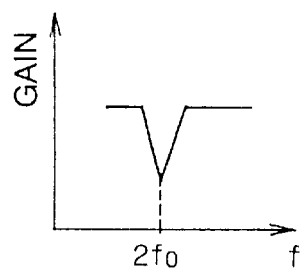

In addition, the HPF 56 may be replaced by a band elimination filter having a frequency property shown in FIG. 19C. In this case, quality of the reproduced information can be enhanced with respect to low frequency component.

V. Fifth Embodiment

Next, a fifth embodiment of the present invention will be described with reference to FIG. 20.

In the aforementioned first embodiment, the wavefront aberration caused by the tilt is compensated by using the LC panel 3 in order to eliminate the influence on the RF signal Srf. In contrast to this, in this embodiment, the optical axis of the light beam B is tilted in order to eliminate the tilt (tilt error) itself.

Like the tilt servo control system 100 of the first embodiment, a tilt servo control system 600, as shown in FIG. 20, has a laser diode 1, a polarizing beam splitter 2, an objective 4, an optical disk 5, a collective lens 6, a detector 7, an error detecting circuit 8 and a reproducing circuit 10. Furthermore, the tilt servo control system 600 has a tilt sensor 60 for detecting tilt of the optical disk 5, a subtracter 64, an adder 61, a tilt driver 62 and a tilt motor 63.

The tilt sensor 60 has two detecting portions 60a and 60b. These detecting portions 60a and 60b are separated from each other in the radial direction of the optical disk 5, as shown in FIG. 20.

The tilt sensor 60 emits a light beam C to be used for detection of tilt, and receives the light beam C reflected by the optical disk 5 with the detecting portions 60a and 60b. When the reflected light beam C is received, the detecting portions 60a and 60b output tilt signals Sa and Sb, respectively. Then, the subtracter 64 subtracts the tilt signal Sa from the tilt signal Sb. Then, the resultant signal is fed as a tilt detection signal Sce from the subtracter 64 into the adder 61.

As the detecting portion 60a and 60b are arranged in the radial direction of the optical disk 5, the tilt of the optical disk 5 results in a difference between intensity of the light beam C received by the detecting portion 60a and that received by the detecting portion 60b (i.e., a difference between the tilt signals Sa and Sb). As a result, the tilt detection signal Sce indicates the amount and direction of the tilt of the optical disk 5 in the radial direction of the optical disk 5.

The tilt detection signal Sce is added to the deviation signal Scc. Then, the resultant signal is fed as a tilt error signal Sm into the tilt driver 62.

The tilt driver 62 generates a driving signal Scd according to the tilt error signal Sm, in order to drive the tilt motor 63. The tilt motor 63 is driven according to the tilt error signal Sm, and thus, the optical axis of the light beam B is tilted. As a result, the tilt between the optical disk 5 and the light beam B is eliminated.

According to the tilt servo control system 600 of the fifth embodiment of the present invention, the amount and direction of the tilt can be detected rapidly and accurately by the simple construction, and the tilt can be completely eliminated.

In addition, if the deviation signal Scc is directly input from the error detecting circuit 8 to the tilt driver 62, similar advantageous effects to the aforementioned embodiment can be obtained.

Furthermore, in the aforementioned embodiments, each of the zero-cross detectors 14 and 24 detects the timing that the level of the basic signal Sosc or the envelope signal Senv becomes zero. However, the present invention is not limited to this. If the basic signal Sosc or the envelope signal Senv includes a DC component, the zero-cross detector may detect the timing that the level of the basic signal Sosc or the envelope signal Senv becomes its average level.

Moreover, the zero-cross detector 14 may detect the timing that the level of the envelope signal Senv becomes any specified level with in the range of the peak level to the bottom level of the envelope signal Senv.

Furthermore, in order to detect the wave form of the envelope signal Senv, it is enough to recognize regular intervals corresponding to the frequency of the basic signal Sosc. Therefore, the zero-cross detector 24 may detect the timing that the level of the basic signal Senv becomes its peak or bottom.

In addition, the present invention can be adapted to an information recording apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-319218 filed on Nov. 20, 1997 including the specification, claims, drawings and summary is incorporated herein by reference in its entirety.

What is claimed is:

1. A method of detecting a deviation in a servo control system to control a controlled system, comprising the processes of:
   applying a disturbance signal, which has a wave form having a constant frequency, to said controlled system;
   detecting a first timing that a level of said disturbance signal reaches a first level;
   detecting a second timing that a level of an output signal output from said control system reaches a second level;
   detecting said variation in said wave form of said output signal by comparing said first timing with said second timing; and
   detecting said deviation on the basis of said detected variation.

2. A method according to claim 1, wherein said first level is an average of said level of said disturbance signal, and said second level is an average of said level of said output signal.

3. A method according to claim 1, wherein said second level is a peak of said level of said output signal.

4. A method according to claim 1, wherein said variation detecting process comprises the processes of:
   generating an envelope of said output signal; and
   detecting a variation in a wave form of said envelope by comparing said wave form of said envelope with said wave form of said disturbance signal.

5. A method of compensating a deviation in a servo control system to control a controlled system comprising the processes of:
   applying a control signal, which is a direct current signal, to said controlled system;
   adding a disturbance signal, which has a wave form having a constant frequency, to said control signal;
   detecting a variation in a wave form of an output signal output from said controlled system by comparing said wave form of said output signal with said wave form of said disturbance signal;
   detecting a first timing that a level of said disturbance signal reaches a first level;
   detecting a second timing that a level of an output signal output from said control system reaches a second level;
   detecting said variation in said wave form of said output signal by comparing said first timing with said second timing;
   detecting said deviation on the basis of said detected variation; and
   varying a level of said control signal on the basis of said detected deviation so as to reduce said detected deviation.

6. A method according to claim 5, wherein said first level is an average of said level of said disturbance signal, and said second level is an average of said level of said output signal.

7. A method according to claim 5, wherein said second level is a peak of said level of said output signal.

8. A method according to claim 5, wherein said variation detecting process comprises the processes of:
   generating an envelope of said output signal; and
   detecting a variation in a wave form of said envelope by comparing said wave form of said envelope with said wave form of said disturbance signal.

9. An apparatus for detecting a deviation in a servo control system to control a controlled system, comprising:
   an applying device for applying a disturbance signal, which has a wave form having a constant frequency, to said controlled system;
   a variation detecting device for detecting a variation in a wave form of an output signal from said controlled system by comparing said wave form of said output signal with said wave form of said disturbance signal, wherein said variation detecting device comprises a first timing detecting device for detecting a first timing that a level of said disturbance signal reaches a first level, a second timing detecting device for detecting a second timing that a level of said output signal reaches a second level, and a wave form variation detecting device for detecting said variation in said wave form of said output signal by comparing said first timing with said second timing; and
   a deviation detecting device for detecting said deviation on the basis of said detected variation.

10. An apparatus according to claim 9, wherein said first level is an average of said level of said disturbance signal, and said second level is an average of said level of said output signal.

11. An apparatus according to claim 9, wherein said second level is a peak of said level of said output signal.

12. An apparatus according to claim 9, wherein said variation detecting device comprises:
   an envelope generating device for generating an envelope of said output signal; and
   an envelope variation detecting device for detecting a variation variation in said wave form of said output signal by comparing said first timing with said second timing.

13. An apparatus for compensating a deviation in a servo control system to control a controlled system, comprising:
   a control signal applying device for applying a control signal, which is a direct current signal, to said controlled system;
   a disturbance signal adding device for adding a disturbance signal, which has a wave form having a constant frequency, to said control signal;
   a variation detecting device for detecting a variation in a wave form of an output signal output from said controlled system by comparing said wave form of said output signal with said wave form of said disturbance signal, wherein said variation detecting device comprises a first timing detecting device for detecting a first timing that a level of said disturbance signal reaches a first level, a second timing detecting device for detecting a second timing that a level of said output signal reaches a second level, and a wave form variation detecting device for detecting said variation in said wave form of said output signal by comparing said first timing with said second timing;
   a deviation detecting device for detecting said deviation on the basis of said detected variation; and
   a varying device for varying a level of said control signal on the basis of said detected deviation so as to reduce said detected deviation.

14. An apparatus according to claim 13, wherein said first level is an average of said level of said disturbance signal, and said second level is an average of said level of said output signal.

15. An apparatus according to claim 13 wherein said second level is a peak of said level of said output signal.

16. An apparatus according to claim 13, wherein said variation detecting device comprises:
   an envelope generating device for generating an envelope of said output signal; and
   an envelope variation detecting device for detecting a variation in a wave form of said envelope by comparing said wave form of said envelope with said wave form of said disturbance signal.

17. A tracking error detecting apparatus for detecting a tracking error caused by a difference between a spot position of a light beam and a track position on an optical disk, comprising:
   an emitting device for emitting said light beam to said optical disk;
   an applying device for applying a disturbance signal, which has a wave form having a constant frequency, to said light beam;
   a light detecting device for detecting said light beam reflected by said optical disk and outputting an output signal corresponding to said detected light beam;
   a variation detecting device for detecting a variation in a wave form of said output signal by comparing said wave form of said output signal with said wave form of said disturbance signal, wherein said variation detecting device comprises a first timing detecting device for detecting a first timing that a level of said disturbance signal reaches a first level, a second timing detecting device for detecting a second timing that a level of said output signal reaches a second level, and a wave form variation detecting device for detecting said variation in said wave form of said output signal by comparing said first timing; and
   a tracking error detecting device for detecting said tracking error on the basis of said detected variation.

18. A tracking error compensating apparatus for compensating a tracking error caused by a difference between a spot position of a light beam and a track position on an optical disk, comprising:
   an emitting device for emitting said light beam to said optical disk;
   an applying device for applying a disturbance signal, which has a wave form having a constant frequency, to said light beam;
   a light detecting device for detecting said light beam reflected by said optical disk and outputting an output signal corresponding to said detected light beam;
   a variation detecting device for detecting a variation in a wave from of said output signal by comparing said wave form of said output signal with said wave form of said disturbance signal, wherein said variation detecting device comprises a first timing detecting device for detecting a first timing that a level of said disturbance signal reaches a first level, a second timing detecting device for detecting a said timing that a level of said output signal reaches a second level, and a wave form variation detecting device for detecting said variation in said wave form of said output signal by comparing said first timing;
   a tracking error detecting device for detecting said tracking error on the basis of said detected variation; and
   an adjusting device for adjusting said spot position of said light beam on the basis of said detected tracking error.

* * * * *